(12) United States Patent
Reshef

(10) Patent No.: US 6,529,559 B2
(45) Date of Patent: Mar. 4, 2003

(54) REDUCED SOFT OUTPUT INFORMATION PACKET SELECTION

(75) Inventor: Ehud Reshef, Neve Efraim Monosom (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 98 days.

(21) Appl. No.: 09/760,401

(22) Filed: Jan. 12, 2001

(65) Prior Publication Data

US 2002/0154704 A1 Oct. 24, 2002

(51) Int. Cl.[7] .............................................. H04L 25/02
(52) U.S. Cl. ...................................................... 375/262
(58) Field of Search ................................ 375/262, 265, 375/264, 232, 229, 286, 341, 340; 714/759, 755, 786, 792, 793, 794, 796

(56) References Cited

U.S. PATENT DOCUMENTS

| | | | |
|---|---|---|---|
| 5,457,704 A | | 10/1995 | Hoeher et al. ................. 371/43 |
| 5,867,478 A | * | 2/1999 | Baum et al. ................. 370/203 |
| 5,867,538 A | * | 2/1999 | Liu ............................. 375/341 |
| 6,154,489 A | * | 11/2000 | Kleider et al. .............. 375/221 |
| 6,158,041 A | * | 12/2000 | Raleigh et al. ............. 714/786 |
| 6,233,712 B1 | * | 5/2001 | Rhee et al. .................. 375/265 |
| 6,389,574 B1 | * | 5/2002 | Belveze et al. ............. 714/794 |

OTHER PUBLICATIONS

Khayrallah, A.S., et al., "Improved Channel Estimation With Side Information", IEEE, pp. 1049–1051, 1997.

Boss, Dieter, et al., "Impact of Blind Versus Non–Blind Channel Estimation on The BER Performance of GSM Receivers", IEEE Signal Processing Workshop on Higher––Order Statistics, pp. 62–66, Jul. 12–23, 1997.

Mehrotra, Asha, GSM System Engineering, Artech House Inc., 1997, pp. 169–245.

Haykin, Simon, Adaptive Filter Theory, Prentice Hall, 1996, pp. 483–535.

Gerstacker, Wolfgang H. et al., "Iterative Equalization With Adaptive Soft Feedback", IEEE, not dated.

Gerstacker, Wolfgang H. et al., "Improved Equalization for GSM Mobile Comunications", IEEE, not dated.

Hafeez, Abdulrauf, et al., "Decision Feedback Sequence Estimation for Unwhitned ISI Channels With Applications to Multiuser Detection"m IEEE Journal on Selected Areas in Communication, vol. 16, No. 9, pp. 1785–1795, Dec. 1998.

Forney, Jr., G. David, "The Viterbi Algorithm", pp. 268–178, Nov. 27, 1972.

Berrou, Claude, et al., "A Low Complexity Soft Output Viterbi Decoder Architecture", IEEE, pp. 737–740, Dec., 1993.

Thielecke, John A. "A Soft–Decision State–Space Equalizer for FIR Channels", IEEE Transactions on Communications, vol. 45, No. 10, pp. 1208–1217. Oct. 10, 1997.

(List continued on next page.)

*Primary Examiner*—Chi Pham
*Assistant Examiner*—Emmanuel Bayard
(74) *Attorney, Agent, or Firm*—Howard Zaretsky

(57) ABSTRACT

An apparatus for and method of reducing the soft output information packet to be computed by a soft symbol generator. The reduced soft output information packet generated by the soft symbol generator is subsequently used by a soft symbol to soft bit mapper which functions to convert soft symbol decision information into soft bit decision information. A symbol competitor table is constructed that includes the most likely symbol competitors for each bit of the symbol. The table is populated with m entries for each possible symbol value, where m represents the number of bits per symbol. Symbol competitors am retrieved from the table in accordance with hard decisions. Soft symbol information is generated only for symbol competitors rather than for all possible symbols thus substantially reducing the size of the information packet.

48 Claims, 10 Drawing Sheets

OTHER PUBLICATIONS

Hansson, Ulf et al., "Soft Information Transfer for Sequence Detection With Concatenated Receivers", IEEE Transactions on Communications, vol. 44, No. 9, pp. 1086–1095, Sep. 1996.

Seshadri, N. et al., "On Post–Decision Symbol–Reliability Generation", IEEE, pp. 741–745, Feb. 1993.

Nagayasu, Takayuki, et al., "A Soft–Output Viterbi Equalizer Employing Expanded Memory Length in a Trellis", IEICE Trans. Commun. vol. E80–B, No. 2, pp. 381–385, Feb. 1997.

Park, Jong II, et al., "Trellis–Based Soft–Output Adaptive Equalization Techniques for TDMA Cellular Systems", IEEE Transactions on Vehicular Technology, vol. 49, No. 1, pp. 83–94, Jan. 2000.

Fossorier, Marc P.C., et al., "On The Equivalence Between SOVA and Max–Log–MAP Decodings", IEEE Communications Letters, vol. 2, No. 5, pp. 137–139, May 1998.

Cong, Ling, et al., "On SOVA for Nonbinary Codes", IEEE Communications Letters, vol. 3, No. 12, pp. 335–337, Dec. 1999.

Hagenauer, Joachim, et al., "A Viterbi Algorithm with Soft–Decision Outputs and its Applications", IEEE, pp. 1680–1686, 1989.

Li, Yunxin, et al., "Optimum Soft–Output Detection for Channels with Intersymbol Interference", IEEE Transactions on Information Theory, vol. 41, No. 3, pp. 704–713, May 1995.

Proakis, John G. Digital Communications, McGraw–Hill, 1989, pp. 602–643.

Han, Youngyearl, "On The Minimization of Overhead in Channel Impulse Response Measurement", IEEE Transactions on Vehicular Technology, vol. 47, No. 2, pp. 631–636, May 1998.

* cited by examiner

REDUCED SOFT OUTPUT INFORMATION PACKET SELECTION

REFERENCE TO RELATED APPLICATION

The subject matter of the present application is related to and may be advantageously combined with the subject matter of commonly owned application U.S. patent application Ser. No. 09/616,161, to Yakhnich et al, filed Jul. 14, 2000, entitled "Method of Channel Order Selection and Channel Order Estimation in a Wireless Communication System," incorporated herein by reference in its entirety.

FIELD OF THE INVENTION

The present invention relates generally to communication systems and more particularly relates to an apparatus for and a method of reducing the soft output information packet to be computed by a soft symbol generator that is subsequently used by a soft symbol to soft bit mapper.

BACKGROUND OF THE INVENTION

In recent years, the world has witnessed explosive growth in the demand for wireless communications and it is predicted that this demand will increase in the future. There are already over 500 million users that subscribe to cellular telephone services and the number is continually increasing. Eventually, in the not too distant future the number of cellular subscribers will exceed the number of fixed line telephone installations. Already, in many cases, the revenues from mobile services already exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short range high speed wireless connections, high rate satellite downlink (and the uplink in some cases) are being offered to users in more and more locations.

In connection with cellular services, the majority of users currently subscribe to digital cellular networks. Almost all new cellular handsets sold to customers are based on digital technology, typically second generation digital technology. Currently, third generation digital networks are being designed and tested which will be able to support data packet networks and much higher data rates. The first generation analog systems comprise the well known protocols AMPS, TACS, etc. The digital systems comprise GSM, TDMA (IS-136) or CDMA (IS-95), for example.

A diagram illustrating an example prior art communication system employing an inner and outer encoder in the transmitter, inner and outer decoding stages in the receiver and a noise source after the channel is shown in FIG. 1. The communication system, generally referenced 10, represents the typical scheme that may be used in many of the communication services described above. In such a system, the transmitter 11 comprises an encoder 14, interleaver 15, symbol generator (i.e. bit to symbol mapper) 16 and modulator 18. Input data bits 12 to be transmitted are input to the encoder 14 which may comprise an error correction encoder such as Reed Solomon, convolutional encoder, parity bit generator, etc. The encoder functions to add redundancy bits to enable errors in transmission to be located and fixed.

It is noted that both the inner and outer decoders in the receiver have complimentary encoders in the system. The outer encoder in the system comprises the encoder 14, e.g., Reed Solomon, etc. The inner encoder comprises the channel 20 which often times can be modeled as an L-symbol long FIR-type channel.

The bits output from the encoder are then interleaved wherein the order of the bits are changed so as to more efficiently combat burst errors. The rearrangement of the bits caused by interleaving improves the resistance to error bursts while adding latency and delay to the transmission.

The bits output from the interleaver are then mapped to symbols by the bit to symbol mapper 16. The bit to symbol mapper functions to transform the bits to modulator symbols. For example, an 8-PSK modulator uses 8 symbols Sk (k=0 ... 7), hence the mapper takes three bits and converts them to one of eight symbols. Thus, the bit to symbol mapper generates a symbol for every three input bits.

The output from the mapper is input to the modulator 18 which receives symbols in the M-ary alphabet and generates the analog signal that is subsequently transmitted over the channel 20. The channel may comprise a mobile wireless channel, e.g., cellular, cordless, a fixed wireless channel, e.g., satellite, or may comprise a wired channel, e.g., xDSL, ISDN, Ethernet, etc. The processing performed in the transmitter is intended to generate a signal that can be transmitted over the channel so as to provide robust, error free detection by the receiver.

At the receiver 13, the analog signal from the channel is input to front end circuitry 22 which demodulates and samples the received signal to generate received samples y(k) 21. The samples are then input to an inner decoder 24. An example of an inner decoder is an equalizer which compensates for the ISI caused by the delay and time spreading of the channel in attempting to detect the symbols that were originally transmitted by the modulator.

Equalizers can be adapted to output hard symbol decisions or soft symbol decisions. Examples of types of commonly used hard decision equalizers include the maximum likelihood sequence estimation (MLSE) equalizer that utilize the well known Viterbi Algorithm (VA), linear equalizer and decision feedback equalizer (DFE). Examples of soft output type equalizers include Soft Output Viterbi Algorithm (SOVA) type equalizers and equalizers based on the more computational expensive Maximum A Posteriori (MAP) algorithm.

In the case of a hard decision equalizer, the output of the inner decoder comprises symbols s(k) 23 which represent hard decisions. If a soft output decoder is used, the symbols s(k) output of the inner decoder comprise soft symbol decisions. For a hard decision inner decoder, the output of the equalizer 24 along with the received samples 21 are input to a soft output generator 25 which functions to generate soft decision information 27 used by the de-interleaver. Note that depending on the type of de-interleaver, the soft output generator is adapted to generate either soft symbol information or soft bit information. In the former case, the de-interleaver must be adapted to perform symbol based de-interleaving. If the de-interleaver is adapted to perform bit based de-interleaving, the soft symbol information output from the soft output generator must first be converted to soft bit information. For example, an 8-PSK modulator uses 8 symbols Sk (k0 ... 7), the mapper converts each symbol to three bits.

The output of the soft output generator is then input to a de-interleaver 26 which functions to restore the original order of either the symbols or the bits, depending on the type of de-interleaver used. The bits are then input to an outer decoder 29 which functions to locate and fix errors using the redundancy inserted by the encoder. The outer decoder generates the binary receive data $a_k$ 28.

Examples of the outer decoder include turbo decoders and convolutional decoders that utilize the Viterbi Algorithm. This class of decoders provides better performance by taking into account soft information about the reliability of the received symbol. The improved performance of the decoder cannot be realized, however, when soft information about the received symbols is not available. Note that the Viterbi algorithm is widely used in communication systems and has been adapted to perform functions including demodulation, decoding, equalization, etc. Many systems utilize the Viterbi Algorithm in both the inner and outer decoding stages.

As described above, the outer decoder, in some systems, is adapted to utilize the symbol decisions output from the inner decoder, e.g., the equalizer. Optimal decoders, however, require soft decisions rather than hard decisions. For example, an outer decoder that utilizes the Viterbi Algorithm to perform convolutional forward error correction decoding, requires soft decisions as input. The advantage of a Viterbi decoder is that it can efficiently process soft decision information. In order to provide soft symbol decisions, the inner decoder typically comprises a soft output equalizer such as a SOVA or MAP based equalizer.

In some cases however, such as when either a punctured code is used or bit based rather symbol based interleaving is used, soft symbol decisions cannot be used by the outer decoder. Further, it is well known that an optimal decoder requires soft bit decisions rather than hard bit decisions. Thus, optimal outer decoders require soft bit inputs rather than soft symbol inputs or hard decisions. Note that a hard decision comprises a bit value (i.e. '0' or '1') and a soft bit decision may comprise a bit value in addition to the reliability of the decision. Alternately, a soft bit decision may comprise only the reliability value for a '1' decision or alternately a '0' decision.

The problem is illustrated when considering a receiver adapted to handle a GSM EGPRS signal. Such a system utilizes a bitwise interleaver and punctured convolutional coding for performing Forward Error Correction (FEC) over channels that require equalization. Assume that the equalizer used employs a Soft Output Viterbi Algorithm in its operation and that the outer FEC decoder employs the Viterbi Algorithm. After de-interleaving, the soft symbol decision information output of the equalizer is no longer related to the bits output of the de-interleaver.

In a system employing an optimal decoder, the equalizer is adapted to provide soft outputs, i.e. soft symbol decisions. As described above, well known soft output equalizers include those based on Maximum Likelihood Sequence Detection or methods such as MAP. However, the use of such techniques is impractical in communication systems having a large symbol alphabet or those systems with channels having a time spread of several symbol periods. Such criteria demand that a reduced complexity soft output equalizer be used.

A prior art technique for generating soft bit decisions is described in "A Soft-Decision State-Space Equalizer for FIR Channels," J. Thielecke, IEEE Transactions on Communications, Vol. 45, No. 10, October 1997. A nonlinear equalizer is described that is intended for FIR channels which is based on a state-space description of the channel. The algorithm utilizes equations that resemble a Kalman hard decision feedback equalizer which incorporates the probability estimates of the received bits.

A disadvantage of this prior art technique is that the level of computational complexity is very high making it difficult to implement in practical communication systems. In addition, the technique is restricted to a particular type of channel and to a particular way of describing the channel.

It is therefore desirable to further reduce the complexity of the soft symbol generator and the number of computations required to generate the soft bit information while maintaining optimal results.

SUMMARY OF THE INVENTION

The present invention is a novel and useful apparatus for and method of reducing the soft output information packet to be computed by a soft symbol generator. The reduced soft output information packet generated by the soft symbol generator is subsequently used by a soft symbol to soft bit mapper which functions to convert soft symbol decision information into soft bit decision information.

The invention is operative to construct (preferably a priori) a symbol competitor table that includes the most likely symbol competitors for each bit of the symbol. The table is populated with m entries for each possible symbol value, where m represents the number of bits per symbol. Symbol competitors are retrieved from the table in accordance with the bard decision. Soft symbol information is generated only for the symbol competitors rather than for all possible symbols thus substantially reducing the size of the information packet.

The invention permits the soft symbol generator to provide fewer soft symbol values. As described above, only m+1 (m in some cases) rather than M soft symbol values are required to compute the bit log likelihood ratios. For each symbol, the hard decision symbol is required along with m soft symbol values. The additional m soft symbol values correspond to the symbol competitors (i.e. nearest neighbors) having a bit opposite to that of the symbol corresponding to the maximum soft symbol value. For the case of 8-PSK, each hard decision has associated with it 3 competing symbols. As shown by simulations, the method of the invention provides for improved performance of several dBs.

The soft symbol information is subsequently input to a soft symbol to soft bit converter. Use of such a converter in the present invention enables the use of soft decoding in systems that incorporate a bit-wise rather than a symbol-wise interleaver. An example of such a system is the GSM Enhanced General Packet Radio System (EGPRS). The present invention is also applicable in systems wherein the encoder uses a different size alphabet than the modulator. A system may have, for example, a ½ rate code encoder concatenated with an 8-PSK modulator. In such a system, the soft symbol decision information output of the equalizer in the receiver does not match the type of soft decision information required by the decoder.

The method of the invention can be performed in either hardware or software. A computer comprising a processor, memory, etc. is operative to execute software adapted to perform the reduced information packet method of the present invention.

The invention provides several advantages. A key advantage is that a bit-wise or symbol-wise interleaver can be used in the system while providing soft bit information to a soft input FEC decoder, e.g., soft decoder for turbo codes, convolutional codes, etc. Another advantage of the invention is that it is independent of the type of soft symbol generator used. Thus, the invention can be used with low complexity soft output generating mechanisms as well as with full complexity SOVA type mechanisms.

Another benefit is that the approximation method and resulting table are computationally efficient in that a minimum number of arithmetic operations are required for their implementation. The symbol competitor table is relatively small and can be easily ROM based. The size of the table is $M\log_2(M)$ for M-ary modulation. Further, the invention can be applied to any size constellations with increasingly greater benefits associated with larger constellations.

There is thus provided in accordance with the present invention a method of generating a symbol competitor table for use in reducing the complexity of an information packet used to generate soft bit values from soft symbol information for am M-ary symbol alphabet, the method comprising the steps of for each of M possible symbol decisions: for each bit position j of m bits per symbol: calculating the Euclidean distance to the M/2 symbol decisions whose bit in position j is opposite to that of the $j_{th}$ bit in the current symbol, selecting the symbol decision yielding a minimum Euclidean distance, placing the symbol decision in the table in accordance with the current symbol and the current bit position and wherein m, M and j are positive integers.

There is also provided in accordance with the present invention a method of reducing a soft output information packet generated by a soft symbol output generator, the method comprising the steps of pre-computing a symbol competitor table comprising the most likely symbol competitors for each possible symbol decision, looking up in the symbol competitor table, for each hard decision, the most likely symbol competitors corresponding to each of m bit positions, generating and outputting soft symbol decision values corresponding to each of the m symbol competitors and wherein m is a positive integer.

There is further provided in accordance with the present invention a method of generating soft bit decisions from hard decisions for an M-ary symbol alphabet, the method comprising the steps of pre-computing a symbol competitor table comprising the most likely symbol competitors for each possible symbol decision, looking up in the symbol competitor table, for each hard decision, the most likely symbol competitors corresponding to each of in bit positions, calculating soft output values corresponding to each symbol competitor, calculating a soft bit decision value for each of m bits as a function of the hard decision and the competitor symbols corresponding to the particular bit position and wherein m and M are positive integers.

There is also provided in accordance with the present invention a communications receiver for receiving and decoding an M-ary transmitted signal comprising a radio frequency (RF) front end circuit for receiving and converting the M-ary transmitted signal to a baseband signal, a demodulator adapted to receive the baseband signal and to generate a received signal therefrom in accordance with the M-ary modulation scheme used to generate the transmitted signal, a first decoder operative to receive the received signal and to generate a sequence of soft symbol decisions therefrom, a soft output computation module comprising processing means programmed to: pre-compute a symbol competitor table comprising the most likely symbol competitors for each possible symbol decision, look up in the symbol competitor table, for each hard decision, the most likely symbol competitors corresponding to each of m bit positions, calculate soft output values corresponding to each symbol competitor, calculate a soft bit decision value for each of m bits as a function of the hard decision and the competitor symbols corresponding to the particular bit position, a second decoder adapted to receive the soft bit values and to generate binary received data therefrom and wherein m and Mare positive integers.

There is still further provided in accordance with the present invention a computer readable storage medium having a computer program embodied thereon for causing a suitably programmed system to generate soft bit decisions from hard decisions by performing the following steps when such program is executed on the system: providing a symbol competitor table comprising the most likely symbol competitors for each possible symbol decision, looking up in the symbol competitor table, for each hard decision, the most likely symbol competitors corresponding to each of m bit positions, calculating soft output values corresponding to each symbol competitor, calculating a soft bit decision value for each of m bits as a function of the hard decision and the competitor symbols corresponding to the particular bit position and wherein m is a positive integer.

There is also provided in accordance with the present invention a method of generating soft bit decisions from hard decisions for an M-ary symbol alphabet, the method comprising the steps of generating a full soft information packet comprising a soft decision for each possible symbol in the alphabet, pre-computing a symbol competitor table comprising the most likely symbol competitors for each possible symbol decision, looking up in the symbol competitor table, for each hard decision, the most likely symbol competitors corresponding to each of q bit positions, calculating a soft bit decision value for each of q bits for the soft symbol decisions in a partial reduced soft information packet comprising soft symbol decisions corresponding to the most likely symbol competitors and wherein q and M are positive integers.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
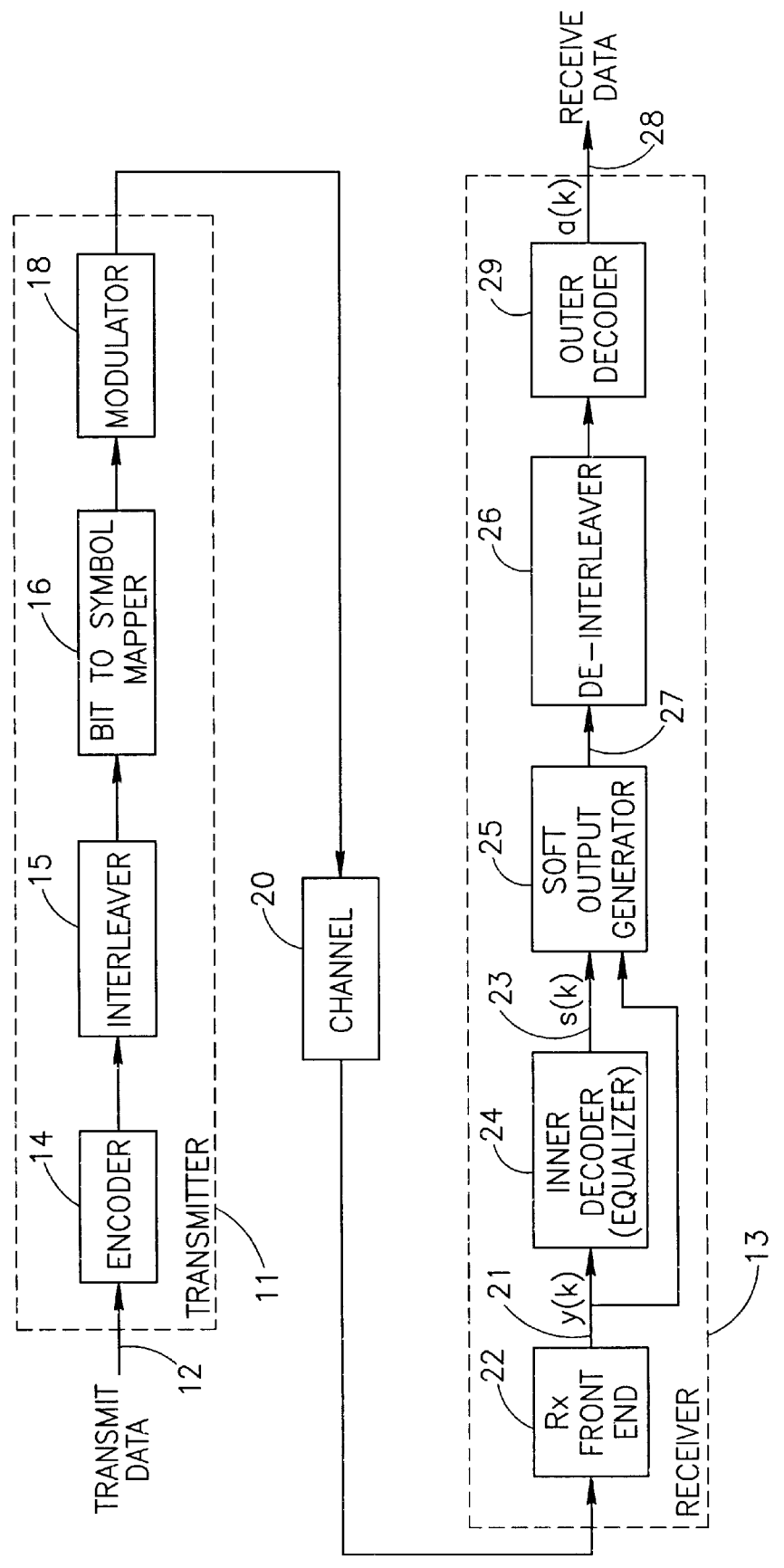
FIG. 1 is a diagram illustrating an example prior art communication system employing an inner and outer encoder in the transmitter, inner and outer decoding stages in the receiver and a noise source added to the channel.

The following notation is used throughout this document.

| Term | Definition |
| --- | --- |
| AMPS | Advanced Mobile Telephone System |
| ASIC | Application Specific Integrated Circuit |
| AWGN | Additive White Gaussian Noise |
| BER | Bit Error Rate |
| CDMA | Code Division Multiple Access |
| CPU | Central Processing Unit |
| DFE | Decision Feedback Equalizer |
| DSL | Digital Subscriber Line |
| DSP | Digital Signal Processor |
| EDGE | Enhanced Data rates for GSM and TDMA/136 Evolution |
| EEPROM | Electrically Erasable Programmable Read Only Memory |
| EEROM | Electrically Erasable Read Only Memory |
| EGPRS | Enhanced General Packet Radio System |
| EPROM | Electrically Programmable Read Only Memory |
| FEC | Forward Error Correction |
| FIR | Finite Impulse Response |
| FPGA | Field Programmable Gate Array |
| GERAN | GSM EDGE Radio Access Network |
| GMSK | Gaussian Minimum Shift Keying |
| GSM | Global System for Mobile Communication |
| IIR | Infinite Impulse Response |
| ISDN | Integrated Services Digital Network |
| ISI | Intersymbol Interference |
| LLR | Log Likelihood Ratio |
| MAP | Maximum A Posteriori |
| MCS | Modulation Coding Scheme |
| MLSD | Maximum Likelihood Sequence Detection |
| MLSE | Maximum Likelihood Sequence Estimation |
| PSK | Phase Shift Keying |
| RAM | Random Access Memory |
| ROM | Read Only Memory |
| SER | Symbol Error Rate |
| SNR | Signal to Noise Ratio |
| SO | Soft Output |
| SOVA | Soft Output Viterbi Algorithm |
| SSA | Suboptimum Soft-output Algorithm |
| SSB | Second Significant Bit |
| TACS | Total Access Communications Systems |
| TDMA | Time Division Multiple Access |
| VA | Viterbi Algorithm |
| WLAN | Wireless Local Area Network |
| WLL | Wireless Local Loop |

Detailed Description of the Invention

The present invention is an apparatus for and method of reducing the soft output information packet to be computed by a soft symbol generator that overcomes the disadvantages of the prior art. The reduced soft output information packet generated by the soft symbol generator is subsequently used by a soft symbol to soft bit mapper which functions to convert soft symbol decision information into soft bit decision information.

The present invention is suitable for use with a wide range of communication systems and is particularly useful in communication systems having large symbol alphabets or in systems with channels having time spreads of several symbol periods. In addition, the invention is applicable to receivers that comprise concatenated coding schemes utilizing bitwise interleaving whereby the output of an inner decoder is subsequently processed by an outer decoder wherein the outer decoder is a soft decision decoder whose performance is optimized when soft decision values are available.

The present invention provides a method of computing only the portion of the complete information packet actually needed by the soft symbol to soft bit mapper. Therefore, use of the invention reduces the requirements of the soft symbol generator. The soft symbol generator need only generate a reduced information packet rather than a complete information packet. Depending on the system and especially the size of the constellation, this can potentially result in large reductions in the number of computations and in the complexity of the processor.

To aid in understanding the principles of the present invention, the method is described in the context of a soft output computation module. As described in more detail below, the soft output computation module is adapted to perform the following functions: noise power estimation, partial information packet calculation, soft symbol value generation and soft symbol to soft bit conversion.

Note that the receiver configuration presented herein is intended for illustration purposes only and is not meant to limit the scope of the present invention. It is appreciated that one skilled in the communication signal processing arts can apply the method of the invention to numerous other topologies and scenarios as well.

Figure 2:
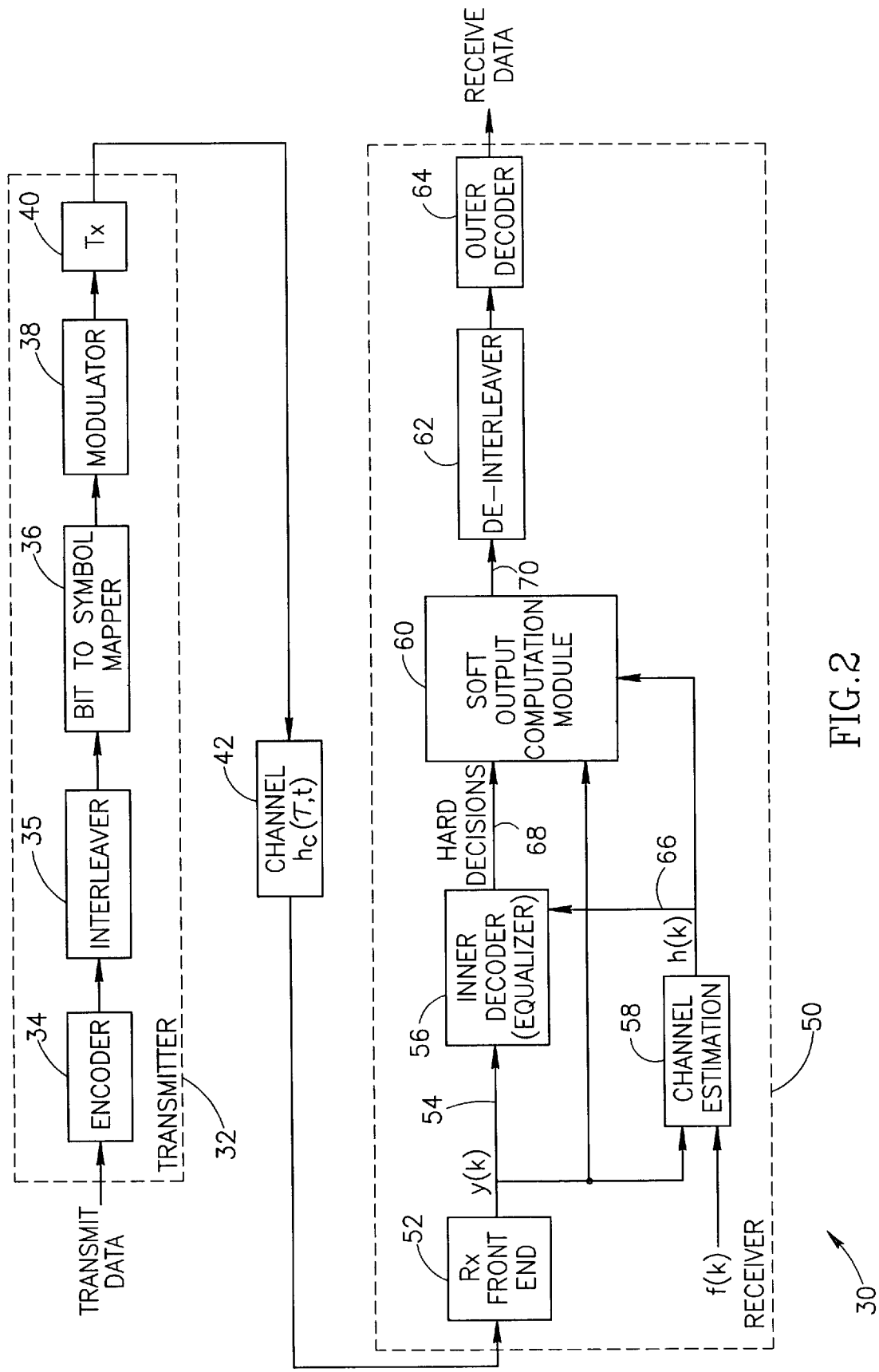
FIG. 2 is a block diagram illustrating a concatenated receiver incorporating a soft output computation module constructed in accordance with the present invention.

A block diagram illustrating a concatenated receiver incorporating a soft output computation module constructed in accordance with the present invention is shown in FIG. 2. The communication system, generally referenced 30, comprises a concatenated encoder transmitter 32 coupled to a channel 42, and a concatenated decoder receiver 50. The transmitter 32 comprises an encoder 34, interleaver 35, bit to symbol mapper 36, modulator 38 and transmit circuit 40.

Input data bits to be transmitted are input to the encoder 34 which may comprise an error correction encoder such as Reed Solomon, convolutional encoder, parity bit generator, etc. The encoder functions to add redundancy bits to enable errors in transmission to be located and fixed.

The bits output of the encoder 34 are then input to an interleaver 35 which functions to rearrange the order of the bits in order to more effectively combat error bursts in the channel. The bits output of the interleaver are then mapped to symbols by the symbol mapper 36. The bit to symbol mapper functions to transform bits to modulator symbols from an M-ary alphabet. For example, an 8-PSK modulator converts input bits into one of eight symbols. Thus, the mapper in this case generates a symbol for every three input bits.

The symbols output from the mapper are input to the modulator 38 which functions to receive symbols in the M-ary alphabet and to generate an analog signal therefrom. The transmit circuit 40 filters and amplifies this signal before transmitting it over the channel 42. The transmit circuit 40 comprises coupling circuitry required to optimally interface the signal to the channel medium.

The channel may comprise a mobile wireless channel, e.g., cellular, cordless, fixed wireless channel, e.g., satellite, or may comprise a wired channel, e.g., xDSL, ISDN, Ethernet, etc. It is assumed that noise is present and added to the signal in the channel. The transmitter is adapted to generate a signal that can be transmitted over the channel so as to provide robust, error free detection by the receiver.

It is noted that both the inner and outer decoders in the receiver have complimentary encoders in the system. The outer encoder in the system comprises the encoder 34, e.g., convolutional, etc. The inner encoder comprises the channel 42, which in one embodiment can be modeled as an L-symbol long FIR-type channel.

At the receiver 50, the analog signal from the channel is input to Rx front end circuitry 52 which demodulates and samples the received signal to generate received samples y(k) 54. The samples are then input to an inner decoder 56 and channel estimation 58.

The channel estimation 58 is operative to generate a channel estimate h(k) 66 that is used by the inner decoder 56 (i.e. equalizer). The channel estimation is generated using the received input samples y(k) 54 and the training sequence f(k).

Several methods of channel estimation are known in the art and suitable for use with the present invention including for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998. pages 631–636. The least square method of channel estimation is described in more detail in the following articles "improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

Another channel estimation technique suitable for use with the present invention is described in U.S. patent application Ser. No. 09/616,161, to Yakhnich et al, filed Jul. 14, 2000, entitled "Method of Channel Order Selection and Channel Order Estimation in a Wireless Communication System," similarly assigned and incorporated herein by reference in its entirety.

The inner decoder is operative to use the channel estimate h(k) in generating the hard decisions. Note that a hard decision is one of the possible values a symbol s(k) can take. An example of an inner decoder is an equalizer which compensates for the ISI caused by the delay and time spreading of the channel. The function of the equalizer is to attempt to detect the symbols that were originally transmitted by the modulator.

Note that the equalizer is adapted to output hard symbol decisions 68 and may comprise, for example the well known maximum likelihood sequence estimation (MLSE) based equalizer that utilizes the well known Viterbi Algorithm (VA), linear equalizer or decision feedback equalizer (DFE). Since the equalizer generates hard decisions only, soft decisions must subsequently be generated from the hard decisions.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM systems.

The MLSE technique is a nonlinear equalization technique which is applicable when the radio channel can be modeled as a Finite Impulse Response (FIR) system. Such a FIR system requires knowledge of the channel impulse response tap values. The channel estimate is obtained using a known training symbol sequence to estimate the channel impulse response. Other equalization techniques such as DFE or linear equalization require precise knowledge of channel.

The hard decisions are input to the soft output computation module 60 which functions to generate soft bit decisions 70 as a function of the hard decisions. Internally, the soft output computation module first computes soft symbol values which are subsequently converted to soft bit decisions.

The soft bit decisions are then input to a bitwise de-interleaver 62 which is operative to reconstruct the original order of the bits input to the transmitter 32. The de-interleaved soft bit values are subsequently input to the outer decoder 64.

The outer decoder is a soft decision decoder, i.e. it takes soft bit values as input, which functions to detect and correct errors using the redundancy bits inserted by the encoder. The outer decoder 64 generates the binary receive data utilizing the soft bit input. Examples of the outer decoder 64 include convolutional decoders utilizing the Viterbi Algorithm, etc. Soft decision Viterbi decoders have the advantage of efficiently processing soft decision information and providing optimum performance in the sense of minimum sequence error probability.

Figure 3:
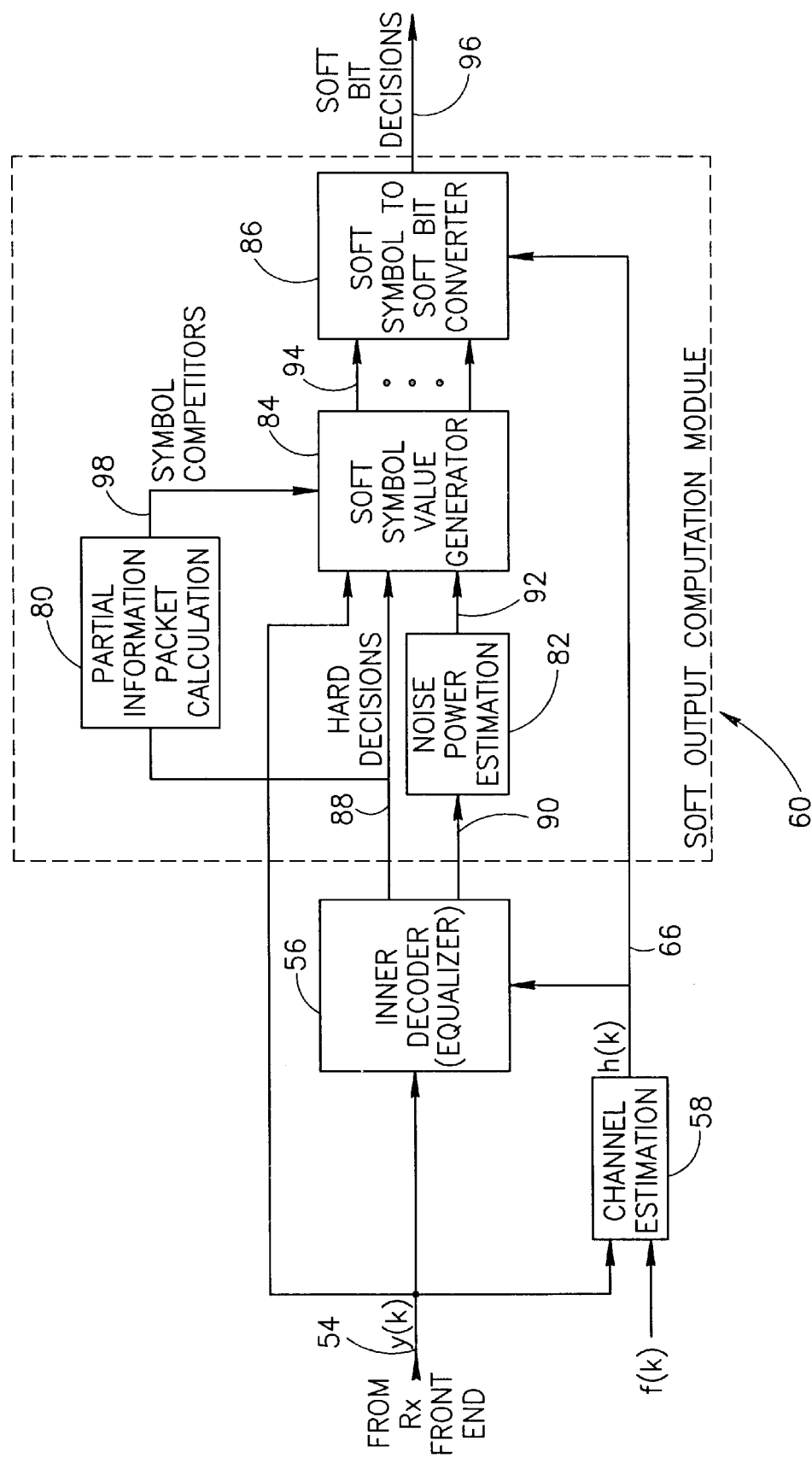
FIG. 3 is a block diagram illustrating the soft output computation module of the present invention in more detail.

A block diagram illustrating the soft output computation module of the present invention in more detail is shown in FIG. 3. The soft output computation module 60 is operative to generate the soft bit values 96 required by the de-interleaver and soft decoder. In particular it comprises a partial information packet calculator constructed in accordance with the present invention 80, soft symbol value generator 84, noise power estimation 82 and soft symbol to soft bit conversion 86.

In operation, the equalizer 56 outputs hard decisions 88 to the soft symbol value generator 84 and the partial information packet calculation 80. For purposes of the invention, it is assumed that hard decision values 88 are available at the output of the equalizer 56. The equalizer also outputs decision information 90 which may be derived from the training sequence to the noise power estimation 82 which functions to generate the noise estimate 92 therefrom. The noise estimate is input to the soft symbol generator which utilizes it in calculating the soft symbol decisions. The soft symbol generator 84 functions to generate the soft symbol information 94 from the hard decisions which is subsequently output to the soft symbol to soft bit converter 86.

Soft symbol values 94 are available at the output of the soft symbol generator 84. Preferably, the soft symbol values are in the form of Log Likelihood Ratio (LLR) values, i.e. $LLR(s_k)$. A soft decision, in the ideal case, comprises the reliabilities of each possible symbol value. The soft decision comprises a partial information packet that is needed by the soft symbol to soft bit converter 86. Note that an information packet is defined as the output generated by a detector or decoder within a single operation. See "Optimum Soft- Output Detection for Channels with Intersymbol Interference," Y. Li, B. Vucetic, Y. Sato, IEEE Trans. on Inform. Theory, Vol. 41, No. 3, May 1995.

The soft symbol values are input to the soft symbol to soft bit converter 86. The converter is operative to convert the soft symbol information into soft bit information. The soft bit values for a symbol are derived by obtaining the conditional probability of a bit in terms of the probability of a symbol. The soft bit decision is calculated in the form of the log likelihood ratio (LLR) of the conditional probability.

The soft bit decision information 96, e.g., LLR($b_k$), output of the converter 86 is input to the bit-wise de-interleaver 62. The output of the de-interleaver comprises the soft bit values in the original bit order. The de-interleaved soft bit values are then input to the outer decoder 64 which comprises a soft input decoder.

In accordance with the invention, however, the requirement of generating the soft symbol information can be reduced from generating soft symbol information for all possible symbols to that of generating soft symbol information for only a partial subset of possible symbols. The oft symbol to soft bit converter 86 used in the present invention requires only in soft symbols rather than M soft symbols, where M is the total number of symbols in the Mary alphabet and m is the number of bits per symbol.

The partial information packet calculator 80 functions to determine which subset of symbols should be generated by the soft symbol generator. The group of symbols selected is referred to as symbol competitors 98. The soft symbol value generator is directed to generate soft symbol values only for the group of symbol competitors. This results in a partial information packet that is smaller than the full information packet.

The complexity and number of required computation can be drastically reduced depending on the size of the alphabet and the constellation. In systems having large M-ary alphabets with large constellations, a significant reduction can be achieved in the size of the information packet generated and in the number of computations that are necessary. For example, in the case of 256 QAM, M=256 and m=8, only 8 (or 9 in some cases) soft symbols are generated using the partial information packet generator of the present invention rather than 256 soft symbols in the case of a full information packet.

Note that any suitable soft symbol generator may be used with the present invention that is operative to generate soft symbol information from bard decisions. A technique for generating the soft decisions is described in U.S. Pat. No. 5,457,704 to Hoeher et al., entitled "Post Processing Method and Apparatus for Symbol Reliability Generation," incorporated herein by reference in its entirety. Another suitable soft symbol generation technique is described in U.S. application Ser. No. 09/754,566, to Yakhnich et al., filed Jan. 4, 2001, entitled "Soft Decision Output Generator," similarly assigned and incorporated herein by reference in its entirety.

The operation of the soft output computation module 60 will now be described in more detail. The mathematical derivation of the expressions for both symbol and bit reliability are presented hereinbelow. It is assumed that an M-ary modulation scheme is used, with M=$2^m$ and having the alphabet $$A=\{A_0, A_1, \ldots A_{M-1}\}$$

Each symbol can then be represented by m number of bits. Note that the modulation scheme used in GSM EDGE systems is 8-PSK with m=3.

The Log Likelihood Ratio of a symbol $s_k$ having the value $A_i$ is defined as $$LLR(s_k = A_i) = \ln\left[\frac{P(\underline{y}|s_k = A_i)}{P(\underline{y}|s_k = A_0)}\right] \quad (1)$$

where $\underline{y}$ is a vector representation of the input;

$S_k$ represents the $k^{th}$ symbol decision;

$A_1$ represents the symbol value.

The soft output generator is capable of generating, at some time k, for the symbol $S_k$, M soft outputs. Alternatively, the soft output generator can produce M−1 soft symbol values wherein the $M^{th}$ symbol value is a reference symbol that is implied. Each soft symbol value comprises the LLR($S_k=A_i$) (or an approximation thereof) for i=1, ..., M−1.

In a similar fashion, the log likelihood ratio of a bit $b_k$ is defined as $$LLR(B_k = 1) = \ln\left[\frac{P(\underline{y}|B_k = 1)}{P(\underline{y}|B_k = 0)}\right] \quad (2)$$

where $B_j$ represents the bit value for the $j^{th}$ bit of the symbol.

The conditional probability function of the input given a particular bit can be expressed as $$P(\underline{y}|B_k=b)=\Sigma P(\underline{y}|S_k B_k=b) \quad (3)$$

An optimal transformation of symbol LLR to bit LLR is thus given by $$LLR(B_j) = \ln\left(\sum_{l \in D_{j1}} e^{LLR(s_k=A_l)}\right) - \ln\left(\sum_{l \in D_{j0}} e^{LLR(s_k=A_l)}\right) \quad (4)$$

where $D_{j0}$ and $D_{j1}$ represent the set of symbols wherein $b_j$=0 and 1, respectively;

$\forall l \in D_{ji}$ and $B_j(A_l)$=i for i=0, 1; j=0, ..., m−1; l=0, ..., M−1.

Thus, the log likelihood ratio for a bit is expressed as a function of the log likelihood ratios of the symbols.

Due to the exponential nature of the conditional probability function in Equations 3 and 4, however, the expression for the bit LLR can be closely approximated by the following $$LLR(B_k=1)=\max\{\ln P(\underline{y}|S_k, B_k=1)\}-\max\{\ln P(\underline{y}|S_k, B_k=0)\} \quad (5)$$

Thus, the log likelihood ratio for a bit can be approximated as the difference between a soft symbol value wherein the bit of interest is a one and a soft symbol value wherein the bit of interest is a zero. Note that this expression represents a suboptimal expression for the bit LLR. Note also that other types of soft bit output other than log likelihood ratios can also be generated. Other types of soft bit output derived using the principles of the present invention are intended to be within the scope of the invention.

Since only $C_1+C_2 \ln P(\underline{y}|S_k)$ values can easily be computed, the approximation given in Equation 5 is used to significantly reduce the complexity and required number of computations. In accordance with the present invention, a further approximation can be made by pre-calculating $S_k$, $B_k=\{0,1\}$ given the most likely symbol at time k, which is the hard decision.

The derivation of Equation 5 will now be described in more detail. The method described herein is performed by the soft output computation module. Considering the assumption made above and the expressions for the symbol and bit LLRs in Equations 1 and 2, respectively, the conditional probability of the input y is determined given a bit is equal to a zero and a one. Let it be defined that symbol $S_k$ consists of m bits denoted by $b_j$ for j=0, . . . , m−1. The probability of input y given $b_j=1$ can be expressed as $$P(\underline{y}|b_j = 1) = \frac{P(b_j = 1, \underline{y})}{P(b_j = 1)} \qquad (6)$$

$$= \frac{\sum_{l \in D_{j1}} P(s_k = A_l, \underline{y})}{P(b_j = 1)}$$

$$= \frac{\sum_{l \in D_{j1}} P(\underline{y}|s_k = A_l) P(s_k = A_l)}{P(b_j = 1)}$$

$$= \frac{1}{P(b_j = 1)} \sum_{l \in D_{j1}} P(\underline{y}|s_k = A_l) P(s_k = A_l)$$

where $\underline{y}$ is a vector representation of the input;
  $S_k$ represents the $k^{th}$ symbol decision;
  $A_l$ represents the symbol value;
  $b_j$ represents the bit value for the $j^{th}$ bit of the symbol;
  $D_{j0}$ and $D_{j1}$ represent the set of symbols wherein $b_j=0$ and 1, respectively;
  $\forall l \in D_{ji}$ and $b_j(A_l)=i$ for i=0, 1; j=0, . . . , m−1; l=0, . . . , M−1.

A reasonable assumption can be made that the a priori probability of symbols and bits are equal (this is a valid assumption for most practical communication systems).

$$P(s_k = A_l) = \frac{1}{M}, \quad \forall l \qquad (7)$$

$$P(b_j = 0) = P(b_j = 1) = \frac{1}{2}$$

Therefore, the following expression for the conditional probability of the input as expressed in Equation 6 can be rewritten in terms of Equation 7.

$$P(\underline{y}|b_j = 1) = \frac{2}{M} \sum_{l \in D_{j1}} P(\underline{y}|s_k = A_l) \qquad (8)$$

Similarly, $$P(\underline{y}|b_j = 0) = \frac{2}{M} \sum_{l \in D_{j0}} P(\underline{y}|s_k = A_l) \qquad (9)$$

Then, the bit Log Likelihood Ratio (LLR) as defined above in Equation 2 can be expressed as follows $$LLR(b_j) = \ln\left(\frac{P(\underline{y}|b_j = 1)}{P(\underline{y}|b_j = 0)}\right) \qquad (10)$$

$$= \ln(P(\underline{y}|b_j = 1)) - \ln(P(\underline{y}|b_j = 0))$$

-continued
$$= \{\ln(P(\underline{y}|b_j = 1)) - \ln(P(\underline{y}|s_k = A_l))\} -$$
$$\{\ln(P(\underline{y}|b_j = 0)) - \ln(P(\underline{y}|s_k = A_0))\}$$

$$= \ln\left(\frac{P(\underline{y}|b_j = 1)}{P(\underline{y}|s_k = A_0)}\right) - \ln\left(\frac{P(\underline{y}|b_j = 0)}{P(\underline{y}|s_k = A_0)}\right)$$

$$= \ln\left(\frac{\sum_{l \in D_{j1}} P(\underline{y}|s_k = A_l)}{P(\underline{y}|s_k = A_0)}\right) - \ln\left(\frac{\sum_{l \in D_{j0}} P(\underline{y}|s_k = A_l)}{P(\underline{y}|s_k = A_0)}\right)$$

$$= \ln\left(\sum_{l \in D_{j1}} \frac{P(\underline{y}|s_k = A_l)}{P(\underline{y}|s_k = A_0)}\right) - \ln\left(\sum_{l \in D_{j0}} \frac{P(\underline{y}|s_k = A_l)}{P(\underline{y}|s_k = A_0)}\right)$$

Substituting Equation 1 into Equation 10 yields an optimal transformation of symbol LLR to bit LLR $$LLR(b_j) = \ln\left(\sum_{l \in D_{j1}} e^{LLR(s_k = A_l)}\right) - \ln\left(\sum_{l \in D_{j0}} e^{LLR(s_k = A_l)}\right) \qquad (4)$$

Thus, the log likelihood ratio for a bit is expressed as a function of the log likelihood ratios of the symbols. The soft symbol to soft bit converter is operative to generate at each time k, for symbol $S_k$, a plurality of m soft bit outputs $$LLR(b_j) i=0 \ldots m-1 \qquad (11)$$

Note that the bit LLR derived using Equation 4 is the optimal transformation of symbol LLR to bit LLR. In accordance with the invention, a suboptimal expression for the bit LLR is derived which enables a significant reduction in complexity of computing the bit LLR. The suboptimal expression is derived by performing an approximation of the symbol probabilities. The approximation takes advantage of the rapid increase of the exponential functions in Equation 4. The maximum symbol value for the symbol where the bit of interest is a one and the maximum symbol value where the bit of interest is a zero are used instead as expressed in Equation 5 above.

From above, it is assumed that a priori probability of symbols and bits are equal, allowing the expression for the conditional probability of the input to be rewritten as in Equations 8 and 9. The bit Log Likelihood Ratio (LLR) as defined above in Equation 2 is determined as expressed below $$LLR(b_j) = \ln\left(\sum_{l \in D_{j1}} \frac{P(\underline{y}|s_k = A_l)}{P(\underline{y}|s_k = A_0)}\right) - \ln\left(\sum_{l \in D_{j0}} \frac{P(\underline{y}|s_k = A_l)}{P(\underline{y}|s_k = A_0)}\right) \qquad (12)$$

Consider the following which embodies the nearest neighbor approximation $$\ln\left(\frac{P(\underline{y}|s_k = A_l)}{P(\underline{y}|s_k = A_0)}\right) > \ln\left(\frac{P(\underline{y}|s_k = A_n)}{P(\underline{y}|s_k = A_0)}\right) \Rightarrow \frac{P(\underline{y}|s_k = A_l)}{P(\underline{y}|s_k = A_0)} \gg \frac{P(\underline{y}|s_k = A_n)}{P(\underline{y}|s_k = A_0)} \qquad (13)$$

where n represents the second largest soft symbol after the maximum. Due to the rapidly increasing exponential functions in the expression for the bit LLR, the maximum symbol value is by far the most dominate probability and the remaining M/2−1 soft symbol values can be ignored.

Therefore, the following approximation is valid $$\ln\left(\sum_{l \in D_{jl}} \frac{P(\underline{y}|s_k = A_l)}{P(\underline{y}|s_k = A_0)}\right) \approx \max_{l \in D_{jl}}\left(\ln\left(\frac{P(\underline{y}|s_k = A_l)}{P(\underline{y}|s_k = A_0)}\right)\right) \quad (14)$$

Thus, the maximum symbol values are substituted for the zero-symbol and one-symbol sums. Substituting Equation 14 into Equation 12 yields $$LLR(b_j) \approx \max_{l \in D_{jl}}\left(\ln\left(\frac{P(\underline{y}|s_k = A_l)}{P(\underline{y}|s_k = A_0)}\right)\right) - \max_{l \in D_{j0}}\left(\ln\left(\frac{P(\underline{y}|s_k = A_l)}{P(\underline{y}|s_k = A_0)}\right)\right) \quad (15)$$

Further substituting Equation 1 into Equation 15 yields an approximation of the transformation of symbol LLR to bit LLR.

$$LLR(b_j) \approx \max_{l \in D_{jl}}(LLR(s_k = A_l)) - \max_{l \in D_{j0}}(LLR(s_k = A_l)) \quad (16)$$

Thus, the log likelihood ratio for a bit can be approximated as the difference between a soft symbol value wherein the bit of interest is a one and a soft symbol value wherein the bit of interest is a zero.

Further, from a geometric point of view, the constellation of the symbol can be analyzed and computed a priori using $$S_{k,1} = \arg\max_{l \in D_{jl}}\{LLR(s_k = A_l)\} \quad \text{and} \quad (17)$$

$$S_{k,0} = \arg\max_{l \in D_{j0}}\{LLR(s_k = A_l)\} \quad (18)$$

where $A_1$ represents the hard decision symbol.

Figure 4:
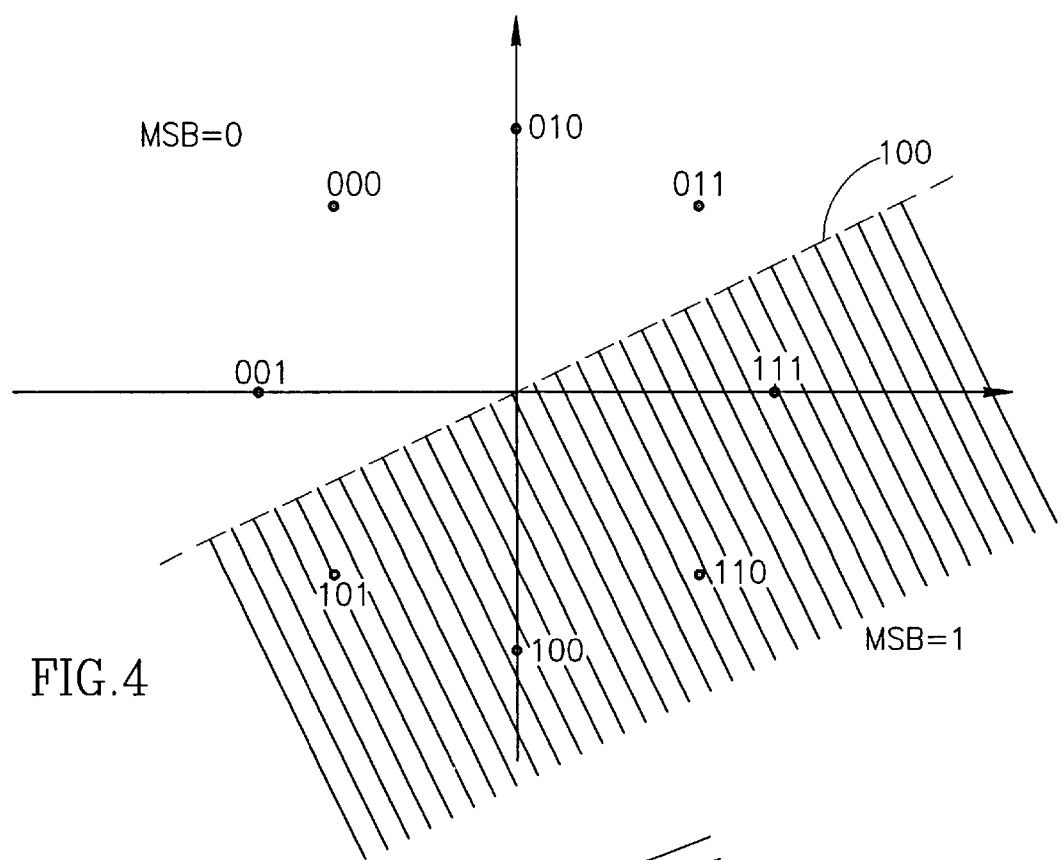
FIG. 4 is a diagram illustrating the symbol mapping of modulating bits for Gray coded 8-PSK modulation and their arrangement into two groups of MSB=0 and MSB=1.
Figure 5:
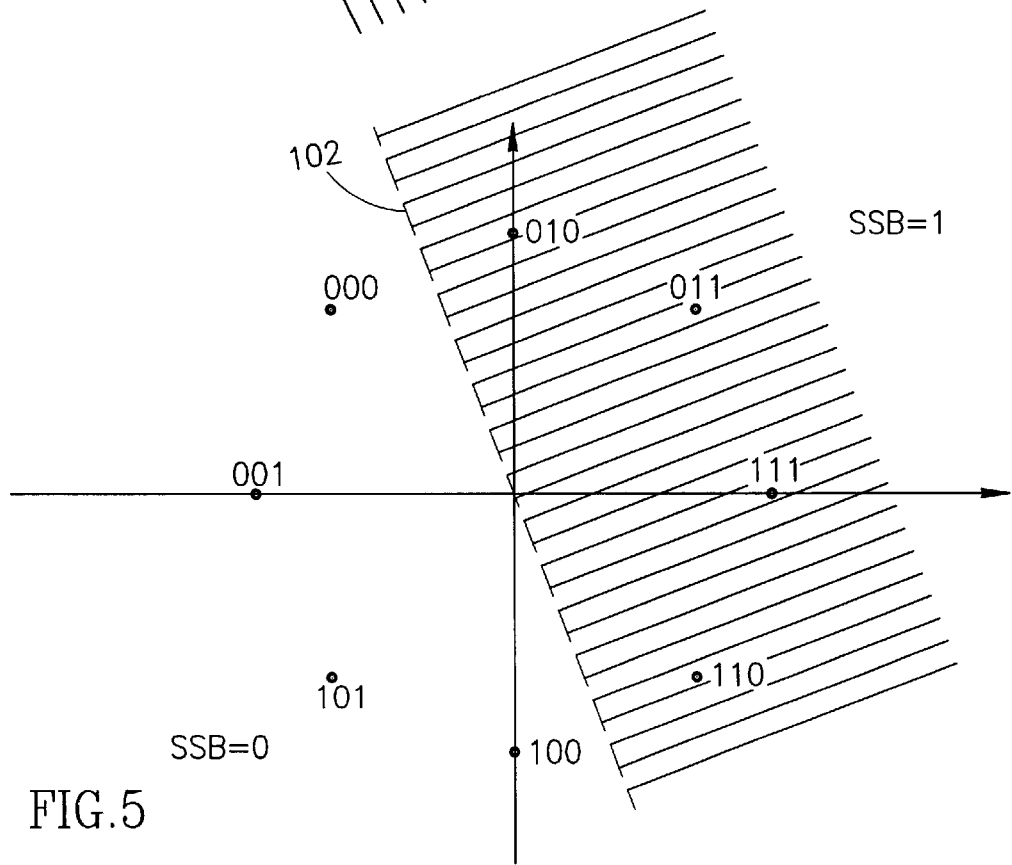
FIG. 5 is a diagram illustrating the symbol mapping of modulating bits for Gray coded 8-PSK modulation and their arrangement into two groups of SSB=0 and SSB=1.
Figure 6:
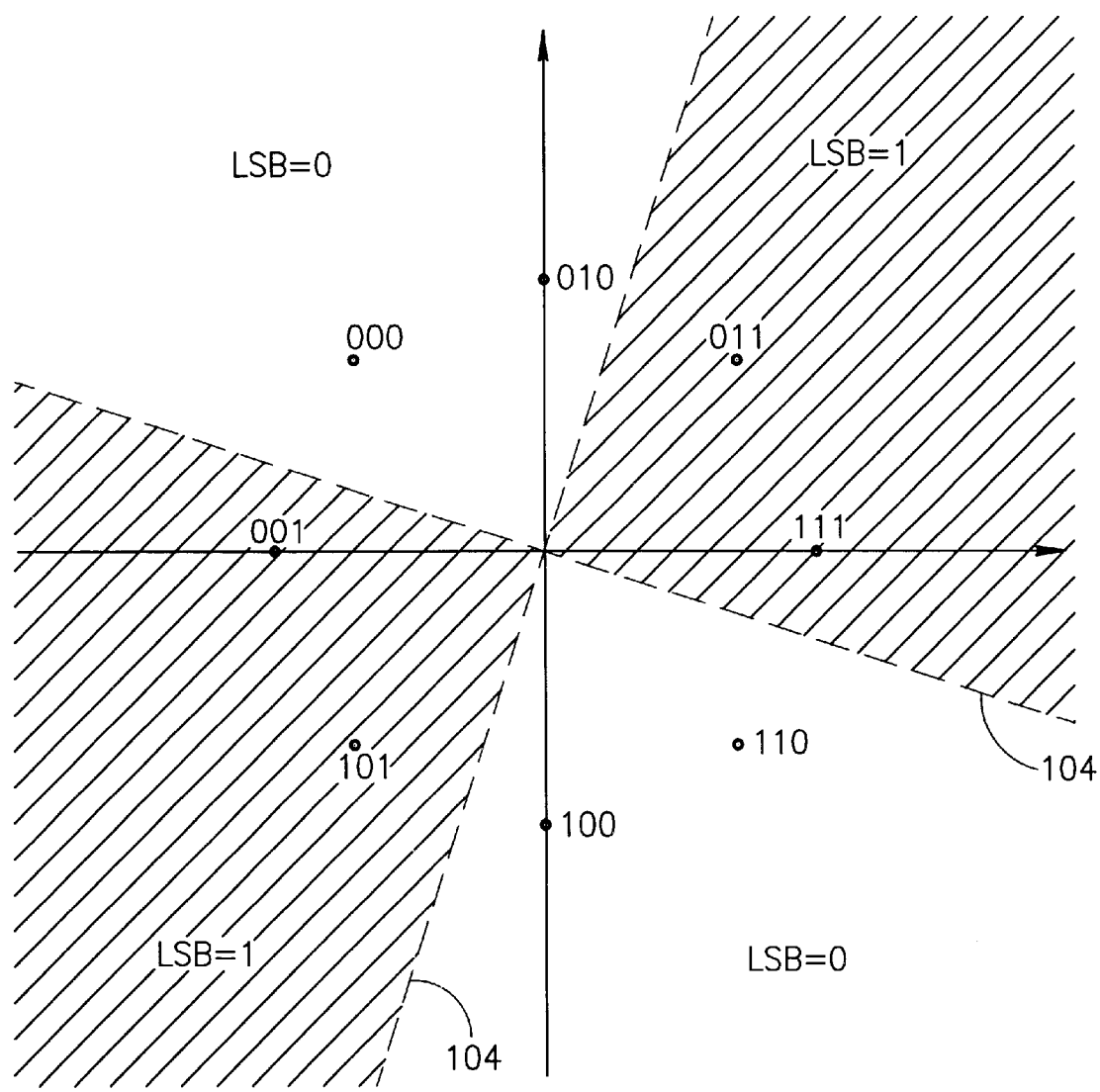
FIG. 6 is a diagram illustrating the symbol mapping of modulating bits for Gray coded 8-PSK modulation and their arrangement into two groups of LSB=0 and LSB=1.

To aid in illustrating the approximation of the method of the present invention, diagrams in FIGS. 4, 5 and 6 are provided that illustrate the symbol mapping of modulating bits and their arrangement into bit groups for an 8-PSK symbol as used in GSM/EDGE systems. In particular, FIG. 4 illustrates the symbol mapping of modulating bits for Gray coded 8-PSK modulation and their arrangement into two groups of MSB=0 and MSB=1. FIG. 5 illustrates the symbol mapping of modulating bits for Gray coded 8-PSK modulation and their arrangement into two groups of SSB=0 and SSB=1. FIG. 6 illustrates the symbol mapping of modulating bits for Gray coded 8-PSK modulation and their arrangement into two groups of LSB=0 and LSB=1. Thus, for any particular hard decision symbol, the remaining M−1 symbols are considered symbol competitors. FIGS. 4, 5 and 6 can be used to determine the symbol competitors for each bit position for any given hard decision symbol.

The symbol mapping diagrams are divided according to bit position. Referring to FIG. 4, dashed line 100 divides the 8 symbols into two groups: one in which the MSB=0 (non-hatched area) and a second in which the MSB=1 (hatched area). Referring to FIG. 5, dashed line 102 divides the 8 symbols into two groups: one in which the SSB (Second Significant Hit) =0 (un hatched area) and a second in which the MSB=1 (hatched area). Referring to FIG. 4, dashed line 100 divides the 8 symbols into two groups: one in which the MSB=0 (un hatched area) and a second in which the MSB=1 (hatched area). Referring to FIG. 4, dashed line 100 divides the 8 symbols into two groups: one in which the MSB=0 (un hatched area) and a second in which the MSB=1 (hatched area).

The diagrams are used to determine which of the soft symbol values to use in computing the bit LLR. For each bit LLR that is to be computed, two symbol LLR values are required: one for the '0' bit and one for the '1' bit of the particular bit position of interest. Both are the maximum soft symbol values for the respective bits. The overall maximum soft symbol value is used for one of the bits while the soft symbol value of the nearest neighbor symbol whose bit is opposite to that of the overall maximum is used for the other.

To illustrate, consider the symbol '101' whose corresponding soft symbol value, denoted by $S_{101}$, is the overall maximum of all M symbols received from the equalizer, i.e. it is the hard decision. The value $S_{101}$ is thus used for the maximum soft symbol value for the one-symbol for the MSB (i.e. bit position j=2), the zero-symbol for the SSB (i.e. bit position j=1) and the one-symbol for the LSB (i.e. bit position j=0).

For the MSB, in accordance with the method, the zero-symbol value is the maximum of all symbols whose MSB=0. The symbol most likely to yield the maximum value is the symbol closest to symbol 101 whose MSB=0. From the diagram in FIG. 4, this symbol is symbol 001. Thus, the soft symbol value of the 001 symbol is taken as the maximum zero-symbol value. In similar fashion, using FIG. 5, the nearest neighbor for the SSB is symbol 110 and, using FIG. 6, for the LSB is symbol 100.

The symbol competitors (or nearest neighbors) can be pre-calculated in accordance with the modulation scheme and the number of symbols in the constellation. To illustrate, the complete list of nearest neighbors for the GSM modulation of 8-PSK is presented below in Table 1.

TABLE 1

Symbol competitors for GSM/EDGE/GERAN 8-PSK modulation

| Reference Symbol (Hard Decision) | MSB (j=2) | SSB (j=1) | LSB (j=0) |
|---|---|---|---|
| 000 | 101 | 010 | 001 |
| 001 | 101 | 010 | 000 |
| 010 | 111 | 000 | 011 |
| 011 | 111 | 000 | 010 |
| 100 | 001 | 110 | 101 |
| 101 | 001 | 110 | 100 |
| 110 | 011 | 100 | 111 |
| 111 | 011 | 100 | 110 |

Thus, for each symbol, only m+1 soft symbol values (the hard decision and m soft symbols) are required which results in reduced complexity for the equalizer and the soft symbol to soft bit converter. Note that m+1 soft symbol values are needed when the symbol conditional probabilities are referenced to the $A_0$ symbol. If the conditional probabilities are referenced to the hard decision instead, only m soft symbols are required which reduces the data to be passed to the soft symbol to soft bit converter.

Figure 7:
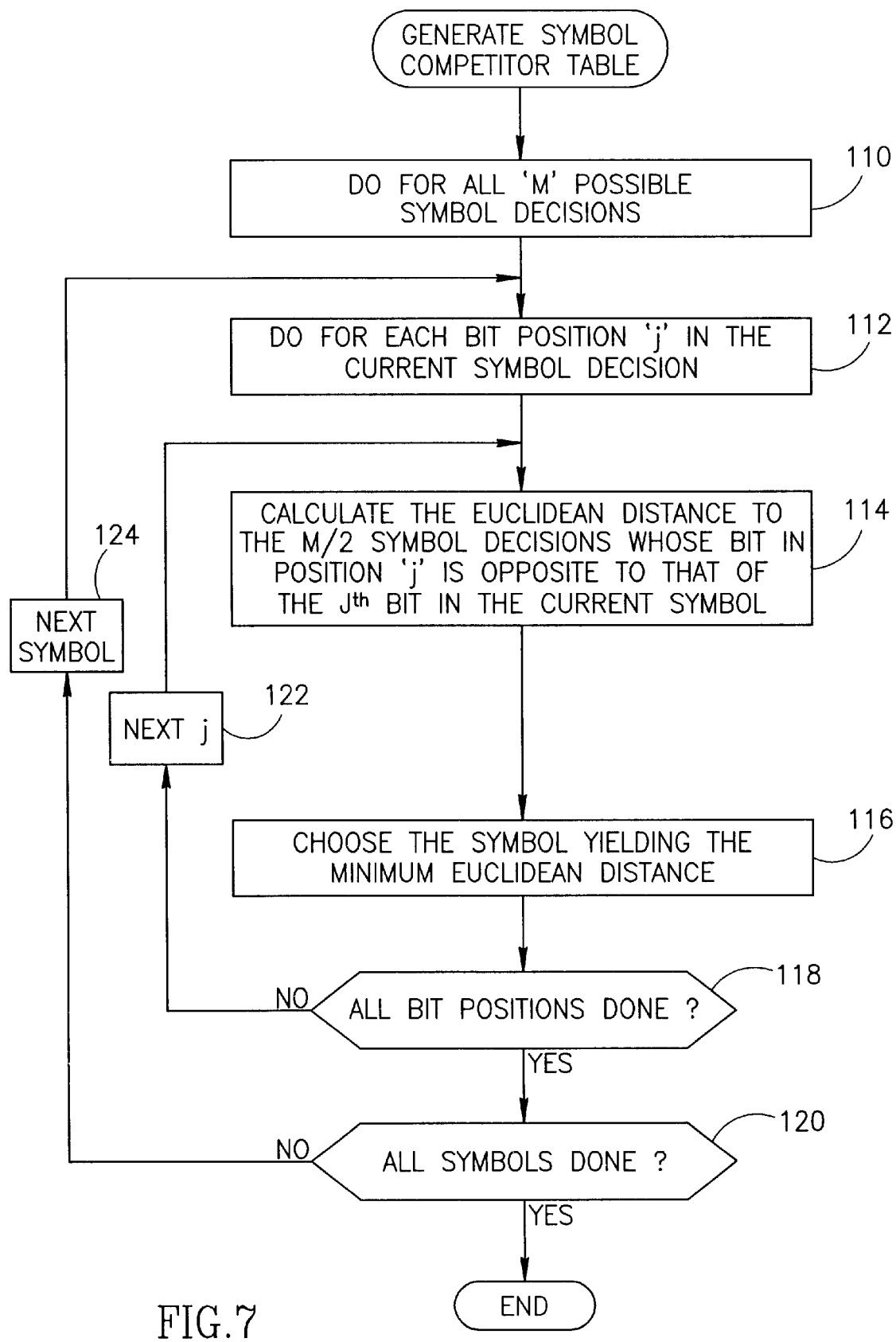
FIG. 7 is a flow diagram illustrating the symbol competitor table generation method of the present invention.

The method of generating the symbol competitor table will now be described in more detail. The method can be performed on a computing device external to the soft output computation module a priori or can be performed by the soft output computation module itself. A flow diagram illustrating the symbol competitor table generation method of the present invention is shown in FIG. 7. The method is performed over all M possible symbols (step 110) and, for each symbol (termed the current symbol), over all possible bit positions j (step 112).

For each bit position, the Euclidean distance (i.e. decision distance) to the M/2 symbol decisions whose bit in position j is opposite to that of the $j^{th}$ in the current symbol is calculated (step 114). The symbol yielding the minimum Euclidean distance is selected (step 116). The method continues trough all bit positions (steps 118, 122) and all symbols (steps 120, 124).

A pseudocode listing of the method of generating the symbol competitor table is shown below in Listing 1. It is appreciated that one skilled in the computer programming arts can easily generate source code for a variety of programming languages using the pseudocode presented below.

Listing 1: Generation of Symbol Competitor Table

```
// The following are given:
// 1. M-ary modulation with alphabet 0 . . . M−1;
// 2. The modulation function is represented by ModFunc(S);
// 3. The number of bits per symbol=m=log₂(M);

int CompetitorsTable[M][m];

for S=0 . . . M−1
   for j=0 . . . m−1 d=Infinity

// 'b' is used to represent the value of the bit while 'j' is used
  to represent its position;

b=((S div (2^j)) mod 2)

for i=0 . . . (M/2 )−1

// 'k' is used to represent the index of the potential symbol
  competitor;
// 'd_k' is used to represent the Euclidean distance 'k' from
  the symbol 'S';

k=(2Ô(j+1))(i div (2Ôj))+(1−b)(2Ôj)+(i mod (2Ôj))
        d_k=|ModFunc(S)−ModFunc(k)|Ô2
        if(d_k<d)
           d=d_k
           CompetitorsTable[S][j]=k
        end
     end
   end
end
```

Note that as in the method of FIG. 7 (step 114) the innermost 'for' loop is only performed for half the number of symbols M. This is because for any given symbol there are only M/2 symbols whose bits in position j equal 0 or 1.

Figure 8:
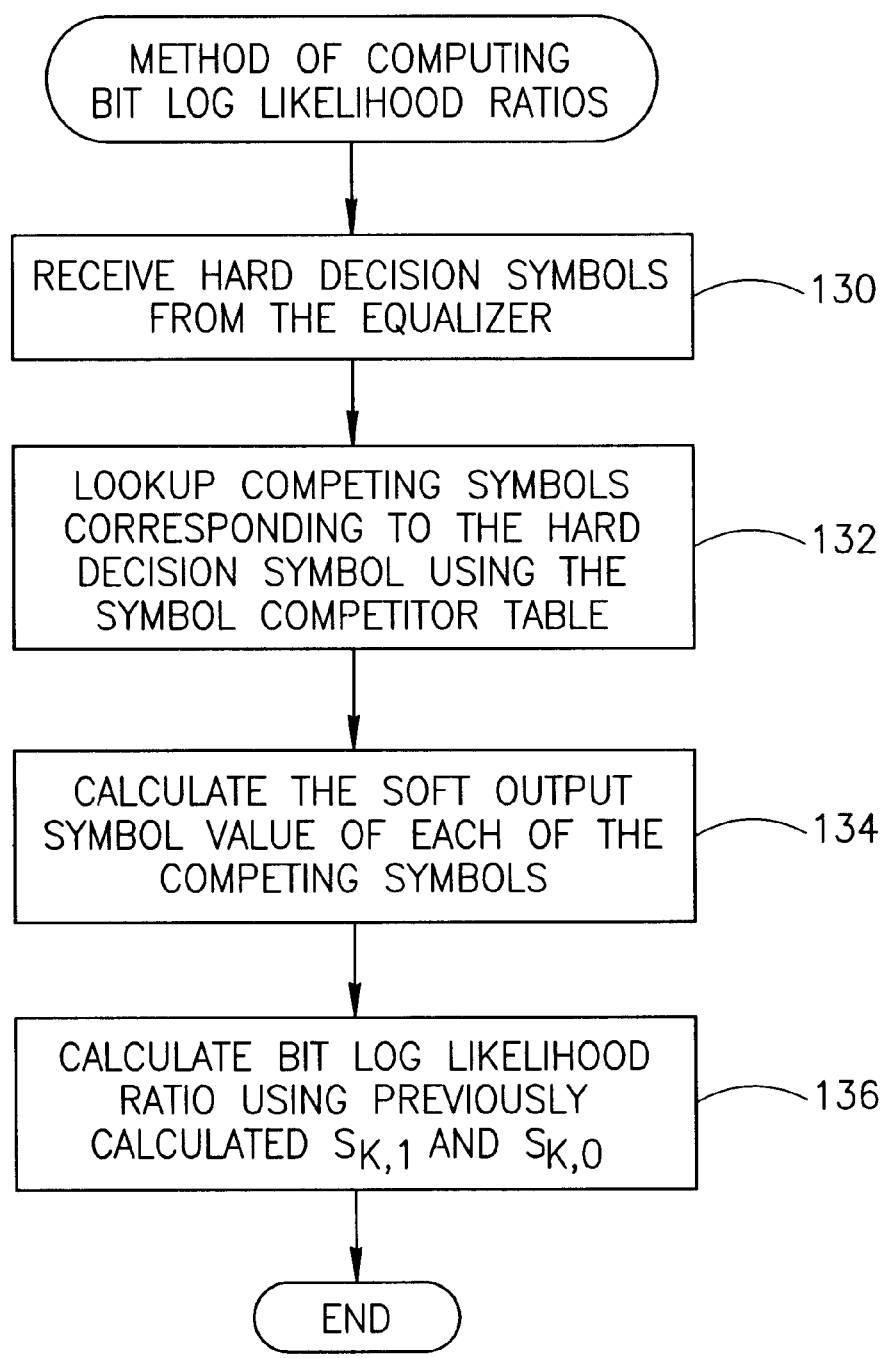
FIG. 8 is a flow diagram illustrating the bit log likelihood ratio computation method of the present invention.

A method of utilizing the symbol competitor table in computing the soft bit information will now be described. A flow diagram illustrating the bit log likelihood ratio computation method of the present invention is shown in FIG. 8. It is assumed that the symbol competitor table such as the one shown in Table 1 above has been pre-computed and stored in memory for use by the soft output computation module 60 (FIG. 2). In particular, the table is utilized by the partial information packet calculation 80 (FIG. 3) in instructing the soft symbol generator 84 which symbols to compute soft symbol information for.

In operation, the partial information packet calculator 80 and the soft symbol generator 84 both receive the hard decision from the equalizer (step 130). The partial information packet calculator looks up the competing symbols corresponding to the hard decision symbol using the symbol competitor table calculated previously (step 132). In response, the soft symbol generator calculates the soft output symbol vales of each of the competing symbols (using Equation 1 if symbol $A_0$ is used as the reference; or Equations 17 and 18 if the hard decision symbol is used as the reference) (step 134).

The soft output symbol values are then input to the soft symbol to soft bit converter 86 which functions to calculate a bit log likelihood ratio for each bit using the $S_{k,1}$ and $S_{k,0}$ calculated by the soft symbol generator (step 136). The soft bit values are the de-interleaved and input to the soft decoder.

The invention provides several advantages. A key advantage is that a bit-wise or symbol-wise interleaver can be used in the system while nevertheless providing soft bit information to a soft input FEC decoder, e.g., soft decoder for turbo codes, convolutional codes, etc. Another advantage of the invention is that it is independent of the type of soft symbol generator used. Thus, the invention can be used with low complexity soft output generating mechanism as well as with full complexity SOVA type mechanism. Another benefit is that the approximation method and resulting table are computationally efficient in that a minimum number of arithmetic operations are required for their implementation. The symbol competitor table is relatively small and can be easily ROM based. The size of the table is $M\log_2(A4)$ for M-ary modulation. Further, the invention can be applied to any size constellations with increasingly greater benefits associated with larger constellations.

In another embodiment of the invention, the symbol competitor data presented in Table 1 above is used to reduce the number of soft bit decisions input to the soft outer decoder. In this embodiment, the soft symbol generator receives a full information packet comprising a soft decision for each possible symbol in the alphabet. The method of the present invention is used to reduce the number of soft bit values that need to be computed. In accordance with the invention, soft bit decisions are computed only for those symbols found to be competitors for the particular hard decision. Thus, the output comprises soft bit decisions for a reduced soft information packet corresponding to the symbol competitors found using the particular hard decision.

GSM EDGE Embodiment

Figure 9:
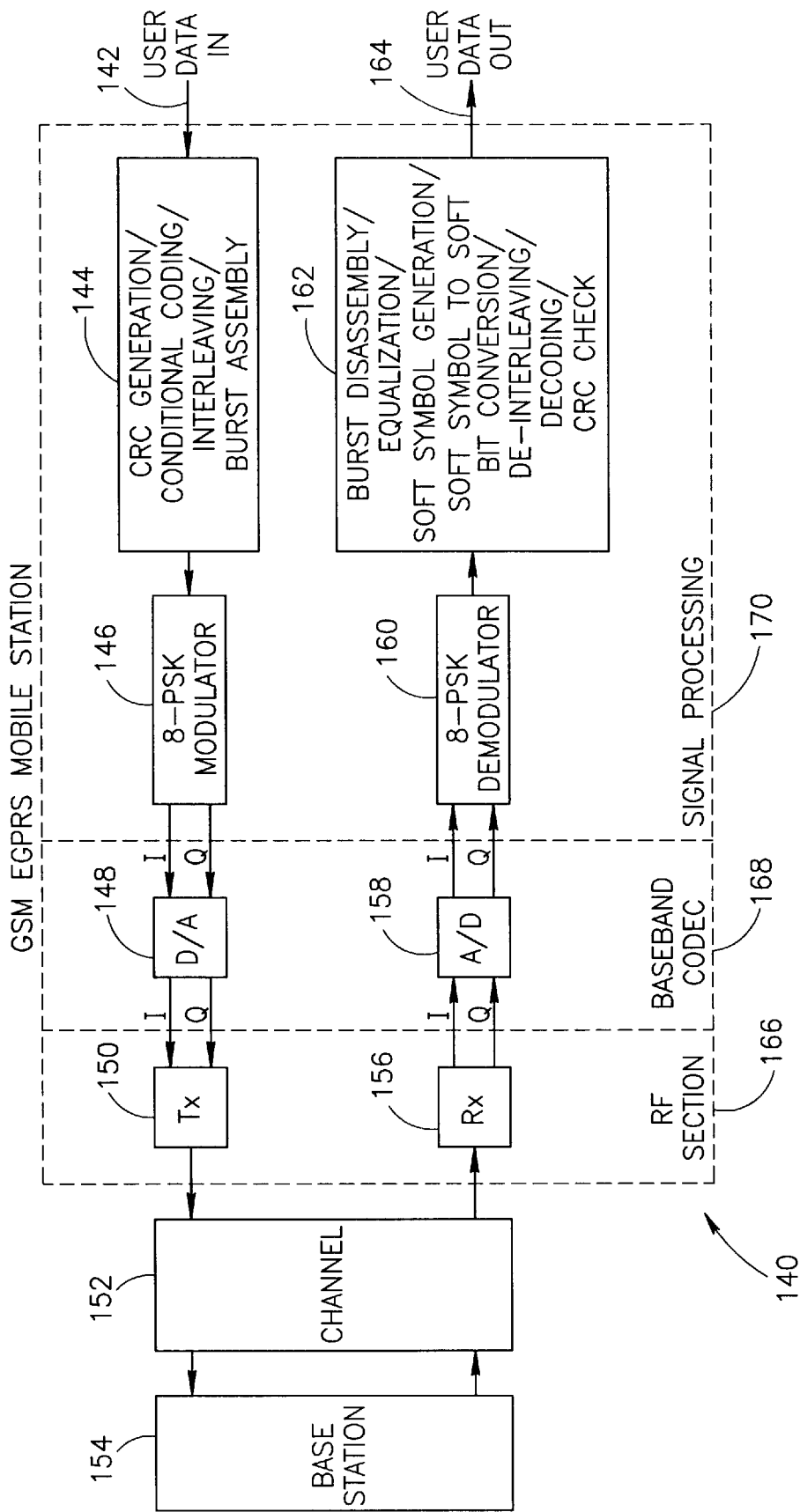
FIG. 9 is a block diagram illustrating the functional processing blocks in a GSM EGPRS mobile station.

A GSM EGPRS mobile station constructed to comprise means for performing the reduced information packet method of the present invention is presented. A block diagram illustrating the functional processing blocks in a GSM EGPRS mobile radio station is shown in FIG. 9. The system is designed to provide reliable data communications at rates of up to 384 kbit/s. The GSM EGPRS mobile station, generally referenced 140, comprises a transmitter and receiver divided into the following sections: signal processing circuitry 170, baseband codec 168 and RF circuitry section 166.

In the transmit direction, the signal processing portion functions to protect the data so as to provide reliable communications from the transmitter to the base station 154 over the channel 152. Several processes performed by the channel coding block 144 are used to protect the user data 142 including cyclic redundancy code (CRC) check, convolutional coding, interleaving and burst assembly. The resultant data is assembled into bursts whereby guard and trail symbols are added in addition to a training sequence midamble that is added to the middle of the burst. Note that both the user data and the signaling information go through similar processing. The assembled burst is then modulated by a modulator 146 which may be implemented as a $3\pi/8$ offset 8-PSK modulator.

In the receive direction, the output of the baseband codec is demodulated using a complementary 8-PSK demodulator 160. Several processes performed by the channel decoding block 162 in the signal processing section are then applied to the demodulated output. The processes performed include burst disassembly, equalization, soft symbol generation including the reduced information packet method of the present invention, soft symbol to soft bit conversion, de-interleaving, convolutional decoding and CRC check.

The baseband codec converts the transmit and receive data into analog and digital signals, respectively, via D/A converter 148 and A/D converter 158. The transmit D/A converter provides analog baseband I and Q signals to the transmitter 150 in the RF circuitry section. The I and Q signals are used to modulate the carrier for transmission over the channel.

In the receive direction, the signal transmitted by the base station over the channel is received by the receiver circuitry 156. The analog signals I and Q output from the receiver are converted back into a digital data stream via the A/D converter. This I and Q digital data stream is filtered and demodulated by the 8-PSK demodulator before being input to the channel decoding block 162. Several processes performed by signal processing block are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the present invention, a GSM Enhanced General Packet Radio System (EGPRS) was simulated and the results are presented herein. The simulation was performed assuming a GSM EGPRS transmitter and a 6 tap TU50iFH standard channel in sensitivity conditions.

Figure 10:
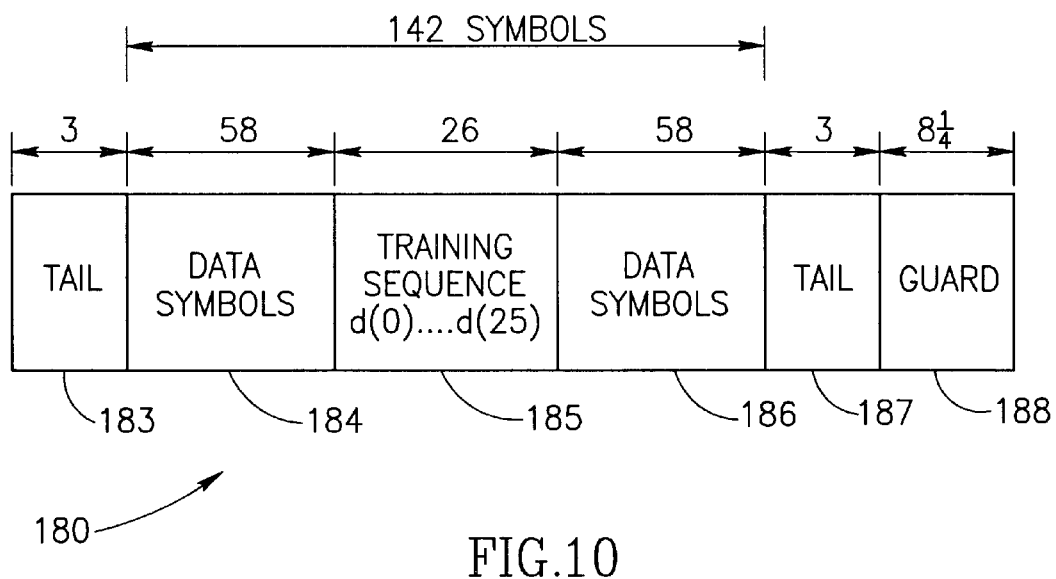
FIG. 10 is a diagram illustrating the elements of a GSM message including tail, data and training symbols.

The EGPRS system is a Time Division Multiple Access (TDMA) system wherein eight users are able to share the same carrier frequency. In an EGPRS transmitter, the data bits are encoded with a rate ⅓ convolutional encoder, interleaved and mapped to 8-ary symbols. The resultant coded data symbols together with the training sequence are assembled into a burst of 142 symbols as shown in FIG. 10.

In GSM, the training sequence is sent in the middle of each burst. Each fixed length burst 180 consists of 142 symbols preceded by a 3 symbol tail 183 and followed by a 3 symbol tail 187 and 8.25 symbol guard 188. The 142 symbols include a 58 symbol data portion 184, 26 symbol training sequence 185 and another 58 symbol data portion 186. Since the training sequence is sent in the middle of the burst, it is referred to as a midamble. It is inserted in the middle of the burst in order to minimize the maximum distance to a data bit thus minimizing the time varying effects at the ends of the burst.

The burst is then modulated using 3π/8-offset 8-PSK with Gaussian pulse shaping in accordance with the GSM standard. The modulated output is transmitted over a frequency selective static Gaussian channel utilizing punctured rate ⅓ convolutional coding. An equalizer operative to generate soft symbol values was used in the receiver. The receiver was adapted to convert the soft symbol information into soft bit information in accordance with the present invention. A soft input Viterbi Algorithm based convolutional decoder was used as the outer decoder. The soft bit values output from the converter were used as input for the soft decoder.

Figure 11:
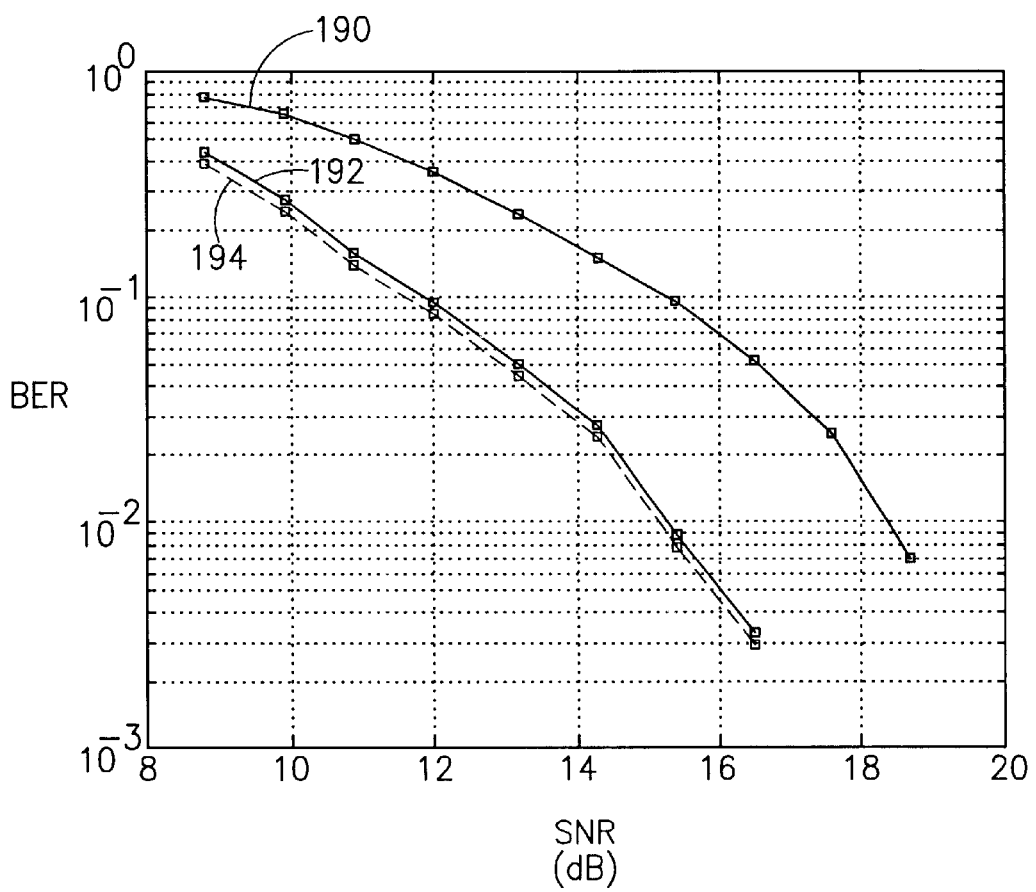
FIG. 11 is a graph illustrating simulation results showing BER at the output of the outer decoder/versus SNR for a concatenated communications receiver constructed with and without the reduced information packet method of the present invention.

A graph illustrating simulation results showing BER at the output of the outer decoder versus SNR for a concatenated communications receiver constructed with and without the reduced information packet method of the present invention is shown in FIG. 11. The solid curve with square boxes 190 represents the BER versus SNR at the output of the outer decoder when hard decisions only were used by the decoder. The solid curve with diamonds 192 represents the BER versus SNR when a sub-optimal reduced information packet, pre-computed in accordance with the present invention, is used by the decoder. The solid curve with circles 194 represents the BER versus SNR when an optimal complete information packet is used by the decoder.

It can be seen that performance gains of 3 to 4 dB can be achieved using the present invention when compared to hard decision decoding. For example, at a BER of $10^{-2}$, a performance gain of nearly 4 dB is achieved when using the reduced information packet. It is also important to note that the degradation due to the use of the sub-optimal reduced information packet is minimal thus providing nearly the same performance improvements as the full information packet case.

Computer Embodiment

Figure 12:
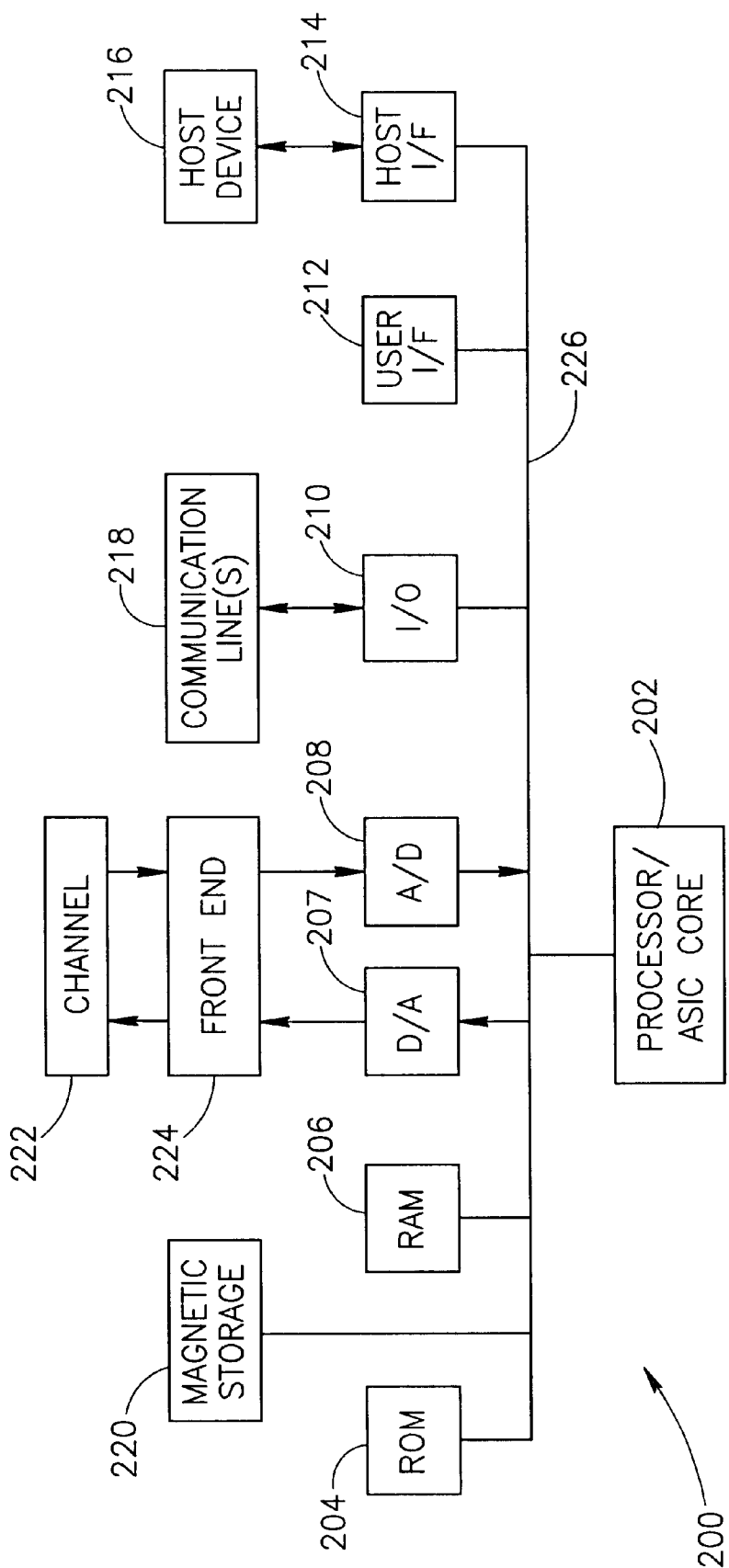
FIG. 12 is a block diagram illustrating an example computer processing system adapted to perform the reduced information packet method of the present invention.

In another embodiment, a computer is operative to execute software adapted to perform the reduced information packet method of the present invention. A block diagram illustrating an example computer processing system adapted to perform the reduced information packet method of the present invention is shown in FIG. 12. The system may be incorporated within a communications device such as a receiver or transceiver, part of which is implemented in software.

The computer system, generally referenced 200, comprises a processor 202 which may be implemented as a microcontroller, microprocessor, microcomputer, ASIC core, central processing unit (CPU) or digital signal processor (DSP). The system further comprises static read only memory 204 and dynamic main memory 206 all in communication with the processor. The processor is also in communication, via a bus 226, with a number of peripheral devices that are also included in the computer system. An A/D converter 208 functions to sample the baseband signal output of the front end circuit 224 coupled to the channel 222. Samples generated by the processor are input to the front end circuit via D/A converter 207. The front end circuit comprises RF circuitry, including receiver, transmitter nd channel coupling circuitry.

One or more communication lines 218 are connected to the system via I/O interface 210. A user interface 212 responds to user inputs and provides feedback and other status information. A host interface 214 connects a host device 216 to the system. The host is adapted to configure, control and maintain the operation of the system. The system may also comprise magnetic storage device 220 for storing application programs and data. The system comprises computer readable storage medium which may include any suitable memory means including but not limited to magnetic storage, optical storage, semiconductor volatile or non-volatile memory, biological memory devices, or ally other memory storage device.

The reduced information packet method software is adapted to reside on a computer readable medium, such as a magnetic disk within a disk drive unit. Alternatively, the computer readable medium may comprise a floppy disk, Flash memory card, EEROM, EPROM or EEPROM based memory, bubble memory storage, ROM storage, etc. The software adapted to perform the reduced information packet method of the present invention may also reside, in whole or in part, in the static or dynamic main memories or in firmware within the processor of the computer system (i.e. within microcontroller, microprocessor, microcomputer, DSP, etc. internal memory).

In alternative embodiments, the method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of generating a symbol competitor table for use in reducing the complexity of an information packet used to generate soft bit values from soft symbol information for an M-ary symbol alphabet, said method comprising the step of:
   for each of M possible symbol decisions:
      for each bit position j of m bits per symbol:
         calculating a Euclidean distance to the M/2 symbol decisions whose bit in position j is opposite to that of the $j^{th}$ bit in the current symbol;
         selecting the symbol decision yielding a minimum Euclidean distance;
         placing said symbol decision in said table in accordance with the current symbol and the current bit position; and
   wherein m, M and j are positive integers.

2. The method according to claim 1, wherein said method is performed in a communications receiver adapted to receive and decode a global system for mobile communication (GSM) signal.

3. The method according to claims 1, wherein said method is performed a priori and a resultant symbol competitor table is incorporated in a communications receiver adapted to receive and decode a global system for mobile communication (GSM signal.

4. The method according to claim 1, wherein said M-ary symbol comprises an 8-PSK symbol.

5. A method of reducing a soft output information packet generated by a soft symbol output generator, said method comprising the steps of:
   pre-computing a symbol competitor table comprising the most likely symbol competitors for each possible symbol decision;
   looking up in said symbol competitor table, for each hard decision, the most likely symbol competitors corresponding to each of m bit positions;
   generating and outputting soft symbol decision values corresponding to each of said m symbol competitors; and
   wherein m is a positive integer.

6. The method according to claim 5, further comprising the step of outputting a hard decision in addition to said soft decision values corresponding to each of said m symbol competitors.

7. The method according to claim 5, wherein said method is performed in a communications receiver adapted to receive and decode a global system for mobile communication (GSM) signal.

8. The method according to claim 5, wherein said symbol competitor table is computed a priori and incorporated in a communications receiver adapted to receive and decode a global system for mobile communication (GSM) signal.

9. The method according to claim 5, further comprising the step of providing an outer decoder operative to generate receive binary data in accordance with said soft bit output values.

10. The method according to claim 9, wherein said outer decoder comprises a convolutional decoder based on a Viterbi Algorithm (VA).

11. The method according to claim 5, wherein each symbol competitor comprises an 8-PSK symbol.

12. The method according to claim 5, wherein said step of generating comprises generating said soft symbol values represented as symbol Log Likelihood Ratios (LLRs).

13. The method according to claim 5, wherein said symbol competitor table is generated by:
   for each of M possible symbol decisions:
      for each bit position j of m bits per symbol:
         calculating a Euclidean distance to the M/2 symbol decisions whose bit in position j is opposite to that of the $j^{th}$ bit in the current symbol;
         selecting the symbol decision yielding a minimum Euclidean distance;
         placing said symbol decision in said table in accordance with the current symbol and the current bit position; and
   wherein M and j are positive integers.

14. A method of generating soft bit decisions from hard decisions for an M-ary symbol alphabet, said method comprising the steps of:
   pre-computing a symbol competitor table comprising the most likely symbol competitors for each possible symbol decision;
   looking up in said symbol competitor table, for each hard decision, the most likely symbol competitors corresponding to each of m bit positions;
   calculating soft output values corresponding to each symbol competitor;
   calculating a soft bit decision value for each of m bits as a function of the hard decision and the competitor symbols corresponding to the particular bit position; and
   wherein m and M are positive integers.

15. The method according to claim 14, wherein said method is performed in a communications receiver adapted to receive and decode a global system for mobile communication (GSM) signal.

16. The method according to claim 14, wherein said symbol competitor table is computed a priori and incorporated in a communications receiver adapted to receive and decode a global system for mobile communication (GSM) signal.

17. The method according to claim 14, further comprising the step of providing an outer decoder operative to generate receive binary data in accordance with said soft bit decision values.

18. The method according to claim 17, wherein said outer decoder comprises a convolutional decoder based on a Viterbi Algorithm (VA).

19. The method according to claim 14, wherein said M-ary symbol comprises an 8-PSK symbol.

20. The method according to claim 14, wherein said step of calculating soft output values comprises generating said soft output values represented as symbol Log Likelihood Ratios (LLRs).

21. The method according to claim 14, wherein said step of calculating soft bit decision values comprises generating said soft bit decision values represented as bit Log Likelihood Ratios (LLRs).

22. The method according to claim 14, wherein said hard decisions are generated by a maximum likelihood sequence estimation (MLSE) equalizer.

23. The method according to claim 14, wherein said hard decisions are generated by a decision feedback equalizer (DFE).

24. The method according to claim 14, further comprising the step of outputting said soft bit values to a de-interleaver whose output is subsequently input to a soft decoder for decoding into binary data therefrom.

25. The method according to claim 14, wherein said soft bit values are generated in accordance with the function given by $$LLR(b_j) \approx \max_{l \in D_{j1}} (LLR(s_k = A_l)) - \max_{l \in D_{j0}} (LLR(s_k = A_l))$$

wherein $LLR(S_k=A_l)$ is the log likelihood ratio of symbol $s_k=A_l$, $A_l$ represents the symbol value, $b_j$ represents the bit value for the $j^{th}$ bit of the symbol, $D_{j0}$ and $D_{j1}$ represent the set of symbols wherein bit $j=0$ and $1$, respectively, $\forall l \in D_{ji}$ and $b_j(A_l)=i$ for $i=0, 1$; $j=0, \ldots$, $m-1$; $l=0, \ldots, M-1$.

26. The method according to claim 14, wherein said symbol competitor table is generated by:
for each of M possible symbol decisions:
for each bit position j of m bits per symbol:
calculating a Euclidean distance to the M/2 symbol decisions whose bit in position j is opposite to that of the $j^{th}$ bit in the current symbol;
selecting the symbol decision yielding a minimum Euclidean distance;
placing said symbol decision in said table in accordance with the current symbol and the current bit position; and
wherein j is a positive integer.

27. A communications receiver for receiving and decoding an M-ary transmitted signal, comprising:
a radio frequency (RF) front end circuit for receiving and converting said M-ary transmitted signal to a baseband signal;
a demodulator adapted to receive said baseband signal and to generate a received signal therefrom in accordance with the M-ary modulation scheme used to generate said transmitted signal;
a first decoder operative to receive said received signal and to generate a sequence of soft symbol decisions therefrom;
a soft output computation module comprising processing means programmed to:
pre-compute a symbol competitor table comprising the most likely symbol competitors for each possible symbol decision;
look up in said symbol competitor table, for each hard decision, the most likely symbol competitors corresponding to each of m bit positions;
calculate soft output values corresponding to each symbol competitor;
calculate a soft bit decision value for each of m bits as a function of the hard decision and the competitor symbols corresponding to the particular bit position;
a second decoder adapted to receive said soft bit values and to generate binary received data therefrom; and
wherein m and M are positive integers.

28. The receiver according to claim 27, further comprising a speech decoder operative to convert said decoded output data signal to an audible speech signal.

29. The receiver according to claim 27, further comprising circuit switch data means for converting said decoded output data signal to a data stream.

30. The receiver according to claim 27, further comprising packet switch data means for converting said decoded output data signal to a data stream.

31. The receiver according to claim 27, wherein said communications receiver is adapted to receive and decode a Global System for Mobile Communication (GSM) signal.

32. The receiver according to claim 27, wherein said second decoder comprises a convolutional decoder based on a Viterbi Algorithm (VA).

33. The receiver according to claim 27, wherein said M-ary symbol comprises an 8-PSK symbol.

34. The receiver according to claim 27, further comprising the step of generating said soft decision value represented as a log likelihood ratio (LLR).

35. The receiver according to claim 27, wherein said first decode comprises a maximum likelihood sequence estimation (MLSE) equalizer based on a Soft Output Viterbi Algorithm (SOVA).

36. The receiver according to claim 27, wherein said first decoder comprises a maximum a posterior (MAP) algorithm based equalizer.

37. The receiver according to claim 27, wherein said soft decision values are generated in accordance with the function given by $$LLR(b_j) \approx \max_{l \in D_{j1}} (LLR(s_k = A_l)) - \max_{l \in D_{j0}} (LLR(s_k = A_l))$$

wherein $LLR(s_k=A_l)$ is the log likelihood ratio of symbol $s_k=A_l$, $A_l$ represents the symbol value, $b_j$ represents the bit value for the $j^{th}$ bit of the symbol, $D_{j0}$ and $D_{j1}$ represent the set of symbols wherein bit $j=0$ and $1$, respectively, $\forall l \in D_{ji}$ and $b_j(A_l)=i$ for $i=0, 1$; $j=0, \ldots$, $m-1$; $l=0, \ldots, M-1$.

38. The receiver according to claim 27, further comprising the step of outputting said soft bit values to a de-interleaver whose output is subsequently input to said second decoder for decoding into binary data therefrom.

39. The receiver according to claim 27, wherein said symbol competitor table is generated by:
for each of M possible symbol decisions:
for each bit positions of m bits per symbol:
calculating a Euclidean distance to the M/2 symbol decisions whose bit in position j is opposite to that of the $J_{th}$ bit in the current symbol,
selecting the symbol decision yielding a minimum Euclidean distance;
placing said symbol decision in said table in accordance with the current symbol and the current bit position; and
wherein j is a positive integer.

40. An electronic data storage media storing a computer program adapted to program a computer to execute the soft output computation process of claim 27.

41. A computer readable storage medium having a computer program embodied thereon for causing a suitably programmed system to generate soft bit decisions from hard decisions by performing the following steps when such program is executed on said system:
- providing a symbol competitor table comprising the most likely symbol competitors for each possible symbol decision;
- looking up in said symbol competitor table, for each hard decision, the most likely symbol competitors corresponding to each of m bit positions;
- calculating soft output values corresponding to each symbol competitor;
- calculating a soft bit decision value for each of m bits as a function of the hard decision and the competitor symbols corresponding to the particular bit position; and
- wherein m is a positive integer.

42. The computer readable storage medium according to claim 41, wherein said symbol competitor table is precomputed and stored in memory.

43. The computer readable storage medium according to claim 41, wherein said symbol competitor table is generated by:
- for each of M possible symbol decisions:
  - for each bit positions of j bits per symbol:
    - calculating a Euclidean distance to the M/2 symbol decisions whose bit in position j is opposite to that of the $j^{th}$ bit in the current symbol;
    - selecting the symbol decision yielding a minimum Euclidean distance;
    - placing said symbol decision in said table in accordance with the current symbol and the current bit position; and
- wherein j is a positive integer.

44. The computer readable storage medium according to claim 41, wherein said soft decision values are generated in accordance with the function given by $$LLR(b_j) \approx \max_{l \in D_{j1}} (LLR(s_k = A_l)) - \max_{l \in D_{j0}} (LLR(s_k = A_l))$$

wherein $LLR(s_k=A_l)$ is the log likelihood ratio of symbol $S_k=A_l$, $A_l$ represents the symbol value, $b_j$ represents the bit value for the $j^{th}$ bit of the symbol, $D_{j0}$ and $D_{j1}$ represent the set of symbols wherein bit $j=0$ and 1, respectively, $\forall l \in D_{ji}$ and $b_j(A_l)=i$ for $i=0, 1; j=0, \ldots, m-1; l=0, \ldots, M-1$.

45. The computer readable storage medium according to claim 41, wherein said method is performed in a communications receiver adapted to receive and decode a global system for mobile communication (GSM) signal.

46. The computer readable storage medium according to claim 41, wherein said symbol competitor table is computed a priori and incorporated in a communications receiver adapted to receive and decode a global system for mobile communication (GSM) signal.

47. The computer readable storage medium according to claim 41, wherein each symbol competitor comprises an 8-PSK symbol.

48. A method of generating soft bit decisions from hard decisions for an M-ary symbol alphabet, said method comprising the steps of:
- generating a full soft information packet comprising a soft decision for each possible symbol in said alphabet;
- pre-computing a symbol competitor table comprising the most likely symbol competitors for each possible symbol decision;
- looking up in said symbol competitor table, for each hard decision, the most likely symbol competitors corresponding to each of q bit positions;
- calculating a soft bit decision value for each of q bits for the soft symbol decisions in a partial reduced soft information packet comprising soft symbol decisions corresponding to said most likely symbol competitors; and
- wherein q and M are positive integers.

* * * * *